United States Patent
Cohen et al.

(10) Patent No.: US 12,533,100 B2
(45) Date of Patent: Jan. 27, 2026

(54) REGISTRATION OF INTRALUMINAL PHYSIOLOGICAL DATA TO LONGITUDINAL IMAGE BODY LUMEN USING EXTRALUMINAL IMAGING DATA

(71) Applicant: PHILIPS IMAGE GUIDED THERAPY CORPORATION, San Diego, CA (US)

(72) Inventors: Asher Cohen, San Diego, CA (US); Pei-Yin Chao, Eindhoven (NL); Ronald Christiaan Helmstrijd, Eindhoven (NL); Efrat Preisler, Haifa (IL)

(73) Assignee: PHILIPS IMAGE GUIDED THERAPY CORPORATION, San Diego, CA (US)

( * ) Notice: Subject to any disclaimer, the term of this patent is extended or adjusted under 35 U.S.C. 154(b) by 300 days.

(21) Appl. No.: 18/075,518

(22) Filed: Dec. 6, 2022

(65) Prior Publication Data

US 2023/0181140 A1 Jun. 15, 2023

Related U.S. Application Data

(60) Provisional application No. 63/292,529, filed on Dec. 22, 2021, provisional application No. 63/288,553, filed on Dec. 11, 2021.

(51) Int. Cl.
| | | |
|---|---|---|
| *A61B 5/0215* | (2006.01) | |
| *A61B 6/00* | (2024.01) | |
| *A61B 6/12* | (2006.01) | |
| *A61B 6/46* | (2024.01) | |
| *A61B 8/12* | (2006.01) | |

(Continued)

(52) U.S. Cl.
CPC .............. *A61B 6/5247* (2013.01); *A61B 6/12* (2013.01); *A61B 6/463* (2013.01); *A61B 8/12* (2013.01); *G06T 7/0012* (2013.01); *G06T 7/20* (2013.01); *G06T 7/30* (2017.01); *G06T 11/00* (2013.01); *A61B 5/0215* (2013.01);
(Continued)

(58) Field of Classification Search
None
See application file for complete search history.

(56) References Cited

U.S. PATENT DOCUMENTS

| | | |
|---|---|---|
| 5,715,827 A | 2/1998 | Corl |
| 6,200,268 B1 | 3/2001 | Vince |

(Continued)

FOREIGN PATENT DOCUMENTS

| | | |
|---|---|---|
| EP | 3884868 A1 | 9/2021 |
| WO | 2021156215 A1 | 8/2021 |

*Primary Examiner* — Amal Aly Farag

(57) ABSTRACT

A system includes a processor circuit that receives intravascular imaging data from an intravascular imaging catheter, an x-ray image from an x-ray imaging device, and intravascular pressure data from an intravascular pressure-sensing guidewire. The processor circuit correlates the intravascular imaging data and the intravascular pressure data to locations along a body lumen shown in the x-ray image. The processor circuit generates a longitudinal view of the body lumen based on the intravascular imaging data and outputs a screen display including the longitudinal view of the body lumen with an overlaid graphical representation corresponding to the intravascular pressure measurements.

11 Claims, 15 Drawing Sheets

(51) Int. Cl.
*G06T 7/00* (2017.01)
*G06T 7/20* (2017.01)
*G06T 7/30* (2017.01)
*G06T 11/00* (2006.01)

(52) U.S. Cl.
CPC .............. *G06T 2207/10116* (2013.01); *G06T 2207/30104* (2013.01); *G06T 2210/41* (2013.01)

(56) References Cited

U.S. PATENT DOCUMENTS

| | | | |
|---|---|---|---|
| 6,381,350 B1 | 4/2002 | Klingensmith | |
| 6,776,763 B2 | 8/2004 | Nix | |
| 7,074,188 B2 | 7/2006 | Nair | |
| 7,175,597 B2 | 2/2007 | Vince | |
| 7,215,802 B2 | 5/2007 | Klingensmith | |
| 7,226,417 B1 | 6/2007 | Eberle | |
| 7,359,554 B2 | 4/2008 | Klingensmith | |
| 7,463,759 B2 | 12/2008 | Klingensmith | |
| 7,846,191 B2 | 12/2010 | Vaynberg | |
| 7,930,014 B2 | 4/2011 | Huennekens | |
| 8,277,386 B2 | 10/2012 | Ahmed | |
| 8,290,228 B2 | 10/2012 | Cohen | |
| 8,463,007 B2 | 6/2013 | Steinberg | |
| 8,582,934 B2 * | 11/2013 | Adler | A61B 5/6852 385/39 |
| 8,670,603 B2 | 3/2014 | Tolkowsky | |
| 8,693,756 B2 | 4/2014 | Tolkowsky | |
| 8,781,193 B2 | 7/2014 | Steinberg | |
| 8,855,744 B2 | 10/2014 | Tolkowsky | |
| 9,138,147 B2 * | 9/2015 | Schmitt | A61B 5/02007 |
| 9,339,348 B2 | 5/2016 | Davies | |
| 10,076,301 B2 | 9/2018 | Millett | |
| 10,648,918 B2 * | 5/2020 | Schmitt | A61B 5/02028 |
| 2006/0241465 A1 | 10/2006 | Huennekens | |
| 2015/0305710 A1 | 10/2015 | Stigall | |
| 2016/0157808 A1 * | 6/2016 | Merritt | A61B 6/504 600/407 |
| 2020/0129142 A1 | 4/2020 | Chao | |
| 2021/0161485 A1 * | 6/2021 | Shige | G06V 10/141 |

* cited by examiner

REGISTRATION OF INTRALUMINAL PHYSIOLOGICAL DATA TO LONGITUDINAL IMAGE BODY LUMEN USING EXTRALUMINAL IMAGING DATA

CROSS-REFERENCE TO RELATED APPLICATIONS

This application claims priority to and the benefit of U.S. Provisional Application No. 63/288,553, filed Dec. 11, 2021, and U.S. Provisional Application No. 63/292,529, filed Dec. 22, 2021, each of which is incorporated by reference herein in its entirety.

TECHNICAL FIELD

The present disclosure relates generally to co-registering data from different medical diagnostic modalities. In particular, physiological data, intravascular imaging data, and x-ray data are tri-registered and physiological data is superimposed over a longitudinal view of intravascular data.

BACKGROUND

Physicians use many different medical diagnostic systems and tools to monitor a patient's health and diagnose medical conditions. Different modalities of medical diagnostic systems may provide a physician with different images, models, and/or data relating to internal structures within a patient. These modalities include invasive devices and systems, such as intravascular systems, and non-invasive devices and systems, such as x-ray systems, and computed tomography (CT) systems. Using multiple diagnostic systems to examine a patient's anatomy provides a physician with added insight into the condition of the patient.

In the field of intravascular imaging and physiology measurement, co-registration of data from invasive devices (e.g., intravascular ultrasound (IVUS) devices or instantaneous wave-free ratio (iFR) devices) with images collected non-invasively (e.g., via x-ray angiography) is a powerful technique for improving the efficiency and accuracy of vascular catheterization procedures. Co-registration identifies the locations of intravascular data measurements along a blood vessel by mapping the data to an angiography image of the vessel. A physician may then know exactly where in the vessel a measurement was made, rather than estimate the location. Co-registration is a particularly useful in the diagnosis and treatment of coronary arterial disease (CAD).

SUMMARY

Embodiments of the present disclosure are systems, devices, and methods for superimposing physiology data, such pressure data, over a longitudinal view of intravascular data. This advantageously allows a user to more easily understand the anatomy of the patient as well as determine optimal treatment pathways. Provided with a view of pressure data and intravascular imaging data at corresponding locations along a longitudinal display of the vessel to be treated, a physician may more quickly and accurately determine the proper type of treatment, such as a stent, and the correct location for the treatment along the vessel, such as proximal and distal landing zones for a stent.

The disclosed system performs a tri-registration of three modalities: physiology data, such as pressure data; intravascular imaging data; and extraluminal images, such as an x-ray angiogram image. The system may co-register physiology data from a pressure pullback procedure to an angiogram to establish a relationship between pressure data and locations along the vessel of interest. The system then co-registers an intravascular ultrasound (IVUS) data, including IVUS images from an IVUS imaging pullback procedure, to the same angiogram. The system then uses the location information of both pullbacks to display the IVUS imaging data and pressure data at the same locations along either an angiogram image or a longitudinal view of the IVUS imaging data.

In an exemplary aspect, a system is provided. The system includes a processor circuit configured for communication with an intraluminal imaging device, and an intraluminal physiology measurement device, wherein the processor circuit is configured to: receive a plurality of intraluminal images obtained by the intraluminal imaging device during movement of the intraluminal imaging device through a body lumen of a patient; receive a plurality of intraluminal physiology measurements obtained by the intraluminal physiology measurement device during movement of the intraluminal physiology measurement device through the body lumen; generate a longitudinal view of the body lumen based on the plurality of intraluminal images; generate a graphical representation based on the plurality of intraluminal physiology measurements; output, to a display in communication with the processor circuit, a screen display comprising: the longitudinal view of the body lumen; and the graphical representation overlaid on the longitudinal view.

In one aspect, the processor circuit is further configured to: co-register the plurality of intraluminal images to first corresponding positions along the body lumen; co-register the plurality of intraluminal physiology measurements to second corresponding positions along the body lumen; and wherein the graphical representation is overlaid on the longitudinal view based on co-registering the plurality of intraluminal images and co-registering the plurality of intraluminal physiology measurements. In one aspect, the graphical representation is overlaid on the longitudinal view such that a location along the graphical representation corresponds to a location along the longitudinal view, and the location along the graphical representation and the location along the longitudinal view are representative of a same corresponding position along the body lumen. In one aspect, the processor circuit is further configured to: identify, based on co-registering the plurality of intraluminal images, a starting position of the movement of the intraluminal imaging device and a length along the body lumen traveled by the intraluminal imaging device during the movement of the intraluminal imaging device; and identify a starting position of the movement of the physiology measurement device and a length along the body lumen traveled by the physiology measurement device during the movement of the physiology measurement device; wherein the graphical representation is overlaid on the longitudinal view based on: the starting position of the movement of the intraluminal imaging device; the length along the body lumen traveled by the intraluminal imaging device; the starting position of the movement of the physiology measurement device; and the length along the body lumen traveled by the physiology measurement device. In one aspect, the processor circuit is further configured to determine an offset between the starting position of the movement of the intraluminal imaging device and the starting position of the movement of the physiology measurement device such that wherein the graphical representation is overlaid on the longitudinal view based on: the offset; the length along the body lumen traveled by the intraluminal imaging device; and the length along the body lumen traveled by the physiology measurement device. In one aspect, the processor circuit is further configured to: identify, based on co-registering the plurality of intraluminal images, a starting position of the movement of the intraluminal imaging device and an ending position of the movement of the intraluminal imaging device; and identify a starting position of the movement of the physiology measurement device and an ending position of the movement of the intraluminal physiology measurement device; wherein the graphical representation is overlaid on the longitudinal view based on: the starting position of the movement of the intraluminal imaging device; the ending position of the movement of the intraluminal imaging device; the starting position of the movement of the physiology measurement device; and the ending position of the movement of the intraluminal physiology measurement device. In one aspect, the graphical representation comprises a plot based on the plurality of intraluminal physiology measurements. In one aspect, the intraluminal physiology measurement device comprises an intravascular pressure measurement device, the plurality of intraluminal physiology measurements comprise a plurality of intravascular pressure measurements, the processor circuit is further configured to calculate a plurality of pressure ratios using the plurality of intraluminal physiology measurements, and the plot based on the plurality of intraluminal physiology measurements comprises a plot of the plurality of pressure ratios. In one aspect, the processor circuit is configured to generate a further graphical representation based on the plurality of intraluminal physiology measurements, the screen display comprises the further graphical representation overlaid on the longitudinal view, the graphical representation comprises a conditioned plot based on the plurality of intraluminal physiology measurements, and the further graphical representation comprises a raw plot based on the plurality of intraluminal physiology measurements. In one aspect, the intraluminal physiology measurement device comprises an intravascular pressure measurement device, the plurality of intraluminal physiology measurements comprise a plurality of intravascular pressure measurements, the processor circuit is further configured to calculate a plurality of pressure ratios using the plurality of intraluminal physiology measurements, and the graphical representation comprises a plurality of shapes representative of amounts of change between the plurality of pressure ratios. In one aspect, the processor circuit is configured to receive, from a user input device in communication with the processor circuit, a user input selecting a portion of the longitudinal view; and the screen display further comprises an indicator overlaid on the longitudinal view and identifying the portion of the longitudinal view. In one aspect, the longitudinal view of the body lumen comprises an image-based longitudinal view comprising the plurality of intraluminal images. In one aspect, the processor circuit is configured to calculate, using the plurality of intraluminal images, a plurality of measurements associated with the body lumen, and the longitudinal view of the body lumen comprises a measurement-based longitudinal view based on the plurality of measurements. In one aspect, the screen display further comprises: an extraluminal image of the body lumen; an indicator of a length traveled by the intraluminal imaging device during the movement of the intraluminal imaging device, wherein the indicator of the length traveled by the intraluminal imaging device is overlaid on the extraluminal image; and an indicator of a length traveled by the intraluminal physiology measurement device during the movement of the intraluminal imaging device, wherein the indicator of the length traveled by the intraluminal physiology measurement device is overlaid on the extraluminal image. In one aspect, the screen display further comprises: an extraluminal image of the body lumen; and an intraluminal image of the plurality of intraluminal images.

In an exemplary aspect, a method is provided. The method includes receiving, with a processor circuit in communication with an intraluminal imaging device, a plurality of intraluminal images obtained by the intraluminal imaging device during movement of an intraluminal imaging device through a body lumen of a patient; receiving, with the processor circuit, a plurality of intraluminal physiology measurements obtained by the intraluminal physiology measurement device during movement of the intraluminal physiology measurement device through the body lumen; generating, with the processor circuit, a longitudinal view of the body lumen based on the plurality of intraluminal images; generating, with the processor circuit, a graphical representation based on the plurality of intraluminal physiology measurements; outputting, to a display in communication with the processor circuit, a screen display comprising: the longitudinal view of the body lumen; and the graphical representation overlaid on the longitudinal view.

In an exemplary aspect, a system is provided. The system includes an intravascular imaging catheter; a pressure-sensing guidewire; a processor circuit configured for communication with the intravascular imaging catheter and the pressure-sensing guidewire, wherein the processor circuit is configured to: receive a plurality of intravascular images obtained by the intravascular imaging catheter during movement of the intravascular imaging catheter through a blood vessel of a patient; receive a plurality of intravascular pressure measurements obtained by the pressure-sensing guidewire during movement of the pressure-sensing guidewire through the blood vessel; generate a longitudinal view of the blood vessel based on the plurality of intravascular images; generate a graphical representation based on the plurality of intravascular pressure measurements; output, to a display in communication with the processor circuit, a screen display comprising: the longitudinal view of the blood vessel; and the graphical representation overlaid on the longitudinal view.

Additional aspects, features, and advantages of the present disclosure will become apparent from the following detailed description.

BRIEF DESCRIPTION OF THE DRAWINGS

Illustrative embodiments of the present disclosure will be described with reference to the accompanying drawings, of which.

DETAILED DESCRIPTION

Figure 1A:
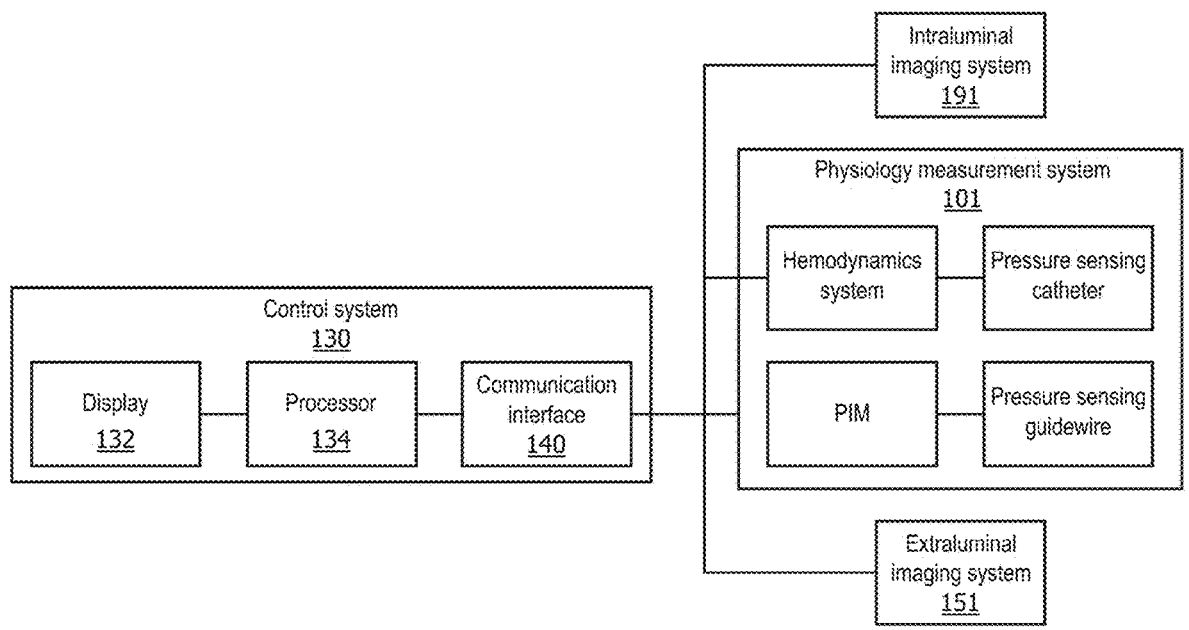
FIG. 1A is a schematic diagram of an intraluminal imaging, physiology measurement, and x-ray system, according to aspects of the present disclosure.

For the purposes of promoting an understanding of the principles of the present disclosure, reference will now be made to the embodiments illustrated in the drawings, and specific language will be used to describe the same. It is nevertheless understood that no limitation to the scope of the disclosure is intended. Any alterations and further modifications to the described devices, systems, and methods, and any further application of the principles of the present disclosure are fully contemplated and included within the present disclosure as would normally occur to one skilled in the art to which the disclosure relates. In particular, it is fully contemplated that the features, components, and/or steps described with respect to one embodiment may be combined with the features, components, and/or steps described with respect to other embodiments of the present disclosure. For the sake of brevity, however, the numerous iterations of these combinations will not be described separately.

FIG. 1A is a schematic diagram of an intraluminal imaging, physiology measurement, and x-ray system, according to aspects of the present disclosure. In some embodiments, the physiology measurement system, the intraluminal imaging system, and the extraluminal imaging system may include three separate systems or be a combination of three systems: a physiology measurement system 101, an intraluminal imaging system 191, and an extraluminal imaging system 151. The physiology measurement system 101 obtains medical data about a patient's body while an intraluminal device is positioned inside the patient's body. For example, the physiology measurement system 101 can control an intraluminal device to obtain intraluminal data of the inside of the patient's body while the intraluminal device is inside the patient's body. The intraluminal imaging system 191 also obtains medical data about a patient's body while an intraluminal device is positioned inside the patient's body. For example, the intraluminal imaging system 101 can control an intraluminal device to obtain intraluminal data of the inside of the patient's body while the intraluminal device is inside the patient's body. The extraluminal imaging system 151 obtains medical data about the patient's body while the extraluminal imaging device 152 is positioned outside the patient's body. For example, the extraluminal imaging system 151 can control extraluminal imaging device 152 to obtain extraluminal images of the inside of the patient's body while the extraluminal imaging device 152 is outside the patient's body. 10

The physiology measurement system 101 may be in communication with the extraluminal imaging system 151 through any suitable components. Such communication may be established through a wired cable, through a wireless signal, or by any other means. In addition, the physiology measurement system 101 may be in continuous communication with the x-ray system 151 or may be in intermittent communication. For example, the two systems may be brought into temporary communication via a wired cable, or brought into communication via a wireless communication, or through any other suitable means at some point before, after, or during an examination. In addition, the physiology measurement system 101 may receive data such as x-ray images, annotated x-ray images, metrics calculated with the x-ray imaging system 151, information regarding dates and times of examinations, types and/or severity of patient conditions or diagnoses, patient history or other patient information, or any suitable data or information from the x-ray imaging system 151. The x-ray imaging system 151 may also receive any of these data from the physiology measurement system 101. In some embodiments, and as shown in FIG. 1, the physiology measurement system 101 and the x-ray imaging system 151 may be in communication with the same control system 130. In this embodiment, both systems may be in communication with the same display 132, processor 134, and communication interface 140 shown as well as in communication with any other components implemented within the control system 130.

The intraluminal imaging system 191 may be in communication with the extraluminal imaging system 151 through any suitable components. Such communication may be established through a wired cable, through a wireless signal, or by any other means. In addition, the intraluminal imaging system 191 may be in continuous communication with the x-ray system 151 or may be in intermittent communication. For example, the two systems may be brought into temporary communication via a wired cable, or brought into communication via a wireless communication, or through any other suitable means at some point before, after, or during an examination. In addition, the intraluminal imaging system 191 may receive data such as x-ray images, annotated x-ray images, metrics calculated with the x-ray imaging system 151, information regarding dates and times of examinations, types and/or severity of patient conditions or diagnoses, patient history or other patient information, or any suitable data or information from the x-ray imaging system 151. The x-ray imaging system 151 may also receive any of these data from the intraluminal imaging system 191. In some embodiments, and as shown in FIG. 1, the intraluminal imaging system 191 and the x-ray imaging system 151 may be in communication with the same control system 130. In this embodiment, both systems may be in communication with the same display 132, processor 134, and communication interface 140 shown as well as in communication with any other components implemented within the control system 130.

The intraluminal imaging system 191 may be in communication with the physiology measurement system 101 through any suitable components. Such communication may be established through a wired cable, through a wireless signal, or by any other means. In addition, the intraluminal imaging system 191 may be in continuous communication with the physiology measurement system 101 or may be in intermittent communication. For example, the two systems may be brought into temporary communication via a wired cable, or brought into communication via a wireless communication, or through any other suitable means at some point before, after, or during an examination. In addition, the intraluminal imaging system 191 may receive data such as pressure data, blood flow data, metrics calculated with the physiology measurement system 101, information regarding dates and times of examinations, types and/or severity of patient conditions or diagnoses, patient history or other patient information, or any suitable data or information from the physiology measurement system 101. The physiology measurement system 101 may also receive any of these data from the intraluminal imaging system 191. In some embodiments, and as shown in FIG. 1, the intraluminal imaging system 191 and the physiology measurement system 101 may be in communication with the same control system 130. In this embodiment, both systems may be in communication with the same display 132, processor 134, and communication interface 140 shown as well as in communication with any other components implemented within the control system 130.

In some embodiments, the system 100 may not include a control system 130 in communication with the physiology measurement system 101, the intraluminal imaging system 191, and/or the x-ray imaging system 151. Instead, the system 100 may include separate control systems. For example, one control system may be in communication with or be a part of the physiology measurement system 101, one control system may be in communication with or be a part of the intraluminal imaging system 191, and an additional separate control system may be in communication with or be a part of the x-ray imaging system 151. In this embodiment, the separate control systems of the physiology measurement system 101, the intraluminal imaging system 191, and the x-ray imaging system 151 may be similar to the control system 130. For example, each control system may include various components or systems such as a communication interface, processor, and/or a display. In this embodiment, any of the control systems of the physiology measurement system 101, the intraluminal imaging system 191, or the extraluminal imaging system 151 may perform any or all of the coregistration steps described in the present disclosure. In some embodiments, one control system 130 may be in communication with and configured to control both the intraluminal imaging system 191 and the physiology measurement system 101, while a separate control system 130 controls the extraluminal imaging system 151. In other embodiments, one control system 130 may be in communication with and configured to control the intraluminal imaging system 191 and the extraluminal imaging system 151, while a separate control system 130 controls the physiology measurement system 101. In other embodiments, one control system 130 may be in communication with and configured to control the physiology measurement system 101 and the extraluminal imaging system 151, while a separate control system 130 controls the intraluminal imaging system 191.

The physiology measurement system 101 can be an invasive blood pressure or blood flow measurement system. In some instances, the physiology measurement system 101 can be a pressure ratio system, such as an instant wave-free ratio (iFR) system, a fractional flow reserve (FFR) system, or a Pd/Pa system. The intraluminal system 101 may include a pressure guide wire, such as a solid core pressure wire. The pressure wire may include one or more features described in U.S. Pat. No. 5,715,827, granted Feb. 10, 1998, and titled "Ultra Miniature Pressure Sensor and Guide Wire Using the Same and Method," U.S. Pat. No. 8,277,386, granted Oct. 2, 2012, and titled, "Combination Sensor Guidewire and Methods of Use," U.S. Pat. No. 9,339,348, granted May 17, 2016, and titled, "Devices, Systems, and Methods for Assessing a Vessel," all of which are hereby incorporated by reference in their entirety.

At a high level, a pressure sensing device may be positioned within a body lumen of a patient. The pressure sensing device may include a pressure-sensing guidewire 102 and a pressure sensing catheter 103. The pressure-guidewire 102 may include a pressure sensor. The pressure-sensing catheter may also include a pressure sensor. During a pressure pullback procedure, the pressure-sensing catheter 103 may be positioned within the vessel at a location proximal to the region to be measured. The sensor of the pressure-sensing guidewire 102 may also be positioned within the vessel at a position distal to the region to be measured. The pressure-sensing catheter 103 may remain substantially stationary during the pullback procedure. The pressure guidewire 102 is then pulled such that the sensor from the distal position in a proximal direction through the vessel. As the distal guidewire sensor moves through the lumen, both the sensor of the guidewire 102 and the sensor of the catheter 103 collect pressure measurements. Thus, for each position of the guidewire 102, two pressure measurements may be collected: a distal guidewire pressure and a proximal catheter pressure. These two pressures may then be compared to generate a pressure ratio. The pressure ratio may be an fractional flow reserve (FFR), instant wave-free ratio (iFR), Pd/Pa, and/other any other suitable pressure ratio. For example, when the two sensors are substantially in the same place within the vessel (e.g., after a pressure pullback procedure is complete), the pressures recorded by each sensor will be the same or substantially the same. The resulting pressure ratio of these two pressures may therefore by 1.0 or close to 1.0. If the starting location of the pullback is distal of a blockage in the vessel, then the pressure measure by the distal guidewire sensor will be less than the pressure measured by the proximal catheter sensor such that the pressure ratio is less than 1.0. How much less than 1.0 the pressure ratio is provides an indication of the severity of the blockage. As the distal guidewire sensor is moved proximally along the guidewire in the vessel from the starting location (distally within the vessel), the pressure measured by the distal guidewire sensor may to vary with respect to the proximal, stationary catheter sensor. As a result, as the distal guidewire sensor is moved, the ratio may begin to increase such that at different locations along the analyzed vessel and as the distal guidewire pressure sensor approaches the proximal catheter sensor, the pressure ratio corresponding to the location of the distal guidewire pressure sensor approaches 1.0.

The communication interface 140 facilitates communication of measurements between the control system 130 and the physiology measurement system 101. In some embodiments, the communication interface 140 performs preliminary processing of the data prior to relaying the data to the processor 134. In an embodiment, the communication interface 140 also supplies high- and low-voltage DC power to support operation of devices of the physiology measurement system 101.

The PIM 104 may be configured to additionally facilitate communication between the physiology measurement system 101 and the control system 130. For example, the PIM 104 may electrically couple a transmission line bundle to the communication interface 140 and physically couples the any pressure sensing device including the pressure sensor guidewire 106 and/or the pressure sensing catheter 103 to the communication interface 140. In some embodiments, the communication interface 140 may be a PIM.

The hemodynamics system 105 may include various features of the physiology measurement system 101. For example, the hemodynamics system 105 may include a communication interface facilitating communication of the pressures sensing catheter 103 and the control system 130. In some embodiments, the hemodynamics system 105 may be in communication with additional elements of the physiology measurement system 101, such as the pressure sensing guidewire 102, or any other systems or devices. For example, the hemodynamics may be in communication with an extraluminal imaging system, such as the extraluminal imaging system 151. The hemodynamics system 105 can be in communication with electrocardiogram (ECG) electrodes and provide a graphical display of an electrocardiogram of the patient's heart. The hemodynamic system 105 can be in communication with a heart rate sensor and provide a graphical display of the heart rate. The hemodynamic system 105 can be in communication with a external blood pressure monitor (e.g., a sphygmomanometer, an inflatable cuff, and/or a manometer) and provide a graphical display of the systolic and diastolic blood pressures.

In some embodiments, the intraluminal device is a pressure sensing device (e.g., pressure-sensing guidewire) that obtains intraluminal (e.g., intravascular) pressure data, and the physiology measurement system 101 is an intravascular pressure sensing system that determines pressure ratios based on the pressure data, such as fractional flow reserve (FFR), instantaneous wave-free ratio (iFR), and/or other suitable ratio between distal pressure and proximal/aortic pressure (Pd/Pa). In some embodiments, the intraluminal device is a flow sensing device (e.g., flow-sensing guidewire) that obtains intraluminal (e.g., intravascular) flow data, and the intraluminal system 101 is an intravascular flow sensing system that determines flow-related values based on the pressure data, such as coronary flow reserve (CFR), flow velocity, flow volume, etc.

Figure 1B:
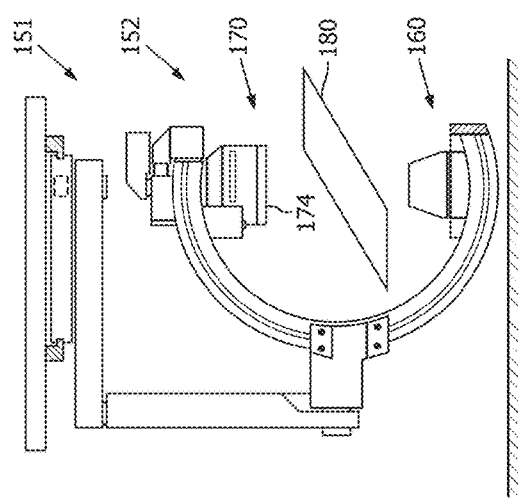
FIG. 1B is a schematic diagram of an extraluminal imaging system, according to aspects of the present disclosure.

FIG. 1B is a schematic diagram of an extraluminal imaging system, according to aspects of the present disclosure. The x-ray imaging system 151 may include an x-ray imaging apparatus or device 152 configured to perform x-ray imaging, angiography, fluoroscopy, radiography, venography, among other imaging techniques. The x-ray imaging system 151 can generate a single x-ray image (e.g., an angiogram or venogram) or multiple (e.g., two or more) x-ray images (e.g., a video and/or fluoroscopic image stream) based on x-ray image data collected by the x-ray device 152. The x-ray imaging device 152 may be of any suitable type, for example, it may be a stationary x-ray system such as a fixed c-arm x-ray device, a mobile c-arm x-ray device, a straight arm x-ray device, or a u-arm device. The x-ray imaging device 152 may additionally be any suitable mobile device. The x-ray imaging device 152 may also be in communication with the control system 130. In some embodiments, the x-ray system 151 may include a digital radiography device or any other suitable device.

The x-ray device 152 as shown in FIG. 1 includes an x-ray source 160 and an x-ray detector 170 including an input screen 174. The x-ray source 160 and the detector 170 may be mounted at a mutual distance. Positioned between the x-ray source 160 and the x-ray detector 170 may be an anatomy of a patient or object 180. For example, the anatomy of the patient (including the vessel 120) can be positioned between the x-ray source 160 and the x-ray detector 170.

The x-ray source 160 may include an x-ray tube adapted to generate x-rays. Some aspects of the x-ray source 160 may include one or more vacuum tubes including a cathode in connection with a negative lead of a high-voltage power source and an anode in connection with a positive lead of the same power source. The cathode of the x-ray source 160 may additionally include a filament. The filament may be of any suitable type or constructed of any suitable material, including tungsten or rhenium tungsten, and may be positioned within a recessed region of the cathode. One function of the cathode may be to expel electrons from the high voltage power source and focus them into a well-defined beam aimed at the anode. The anode may also be constructed of any suitable material and may be configured to create x-radiation from the emitted electrons of the cathode. In addition, the anode may dissipate heat created in the process of generating x-radiation. The anode may be shaped as a beveled disk and, in some embodiments, may be rotated via an electric motor. The cathode and anode of the x-ray source 160 may be housed in an airtight enclosure, sometimes referred to as an envelope.

In some embodiments, the x-ray source 160 may include a radiation object focus which influences the visibility of an image. The radiation object focus may be selected by a user of the system 100 or by a manufacture of the system 100 based on characteristics such as blurring, visibility, heat-dissipating capacity, or other characteristics. In some embodiments, an operator or user of the system 100 may switch between different provided radiation object foci in a point-of-care setting.

The detector 170 may be configured to acquire x-ray images and may include the input screen 174. The input screen 174 may include one or more intensifying screens configured to absorb x-ray energy and convert the energy to light. The light may in turn expose a film. The input screen 174 may be used to convert x-ray energy to light in embodiments in which the film may be more sensitive to light than x-radiation. Different types of intensifying screens within the image intensifier may be selected depending on the region of a patient to be imaged, requirements for image detail and/or patient exposure, or any other factors. Intensifying screens may be constructed of any suitable materials, including barium lead sulfate, barium strontium sulfate, barium fluorochloride, yttrium oxysulfide, or any other suitable material. The input screen 374 may be a fluorescent screen or a film positioned directly adjacent to a fluorescent screen. In some embodiments, the input screen 374 may also include a protective screen to shield circuitry or components within the detector 370 from the surrounding environment. In some embodiments, the x-ray detector 170 may include a flat panel detector (FPD). The detector 170 may be an indirect conversion FPD or a direct conversion FPD. The detector 170 may also include charge-coupled devices (CCDs). The x-ray detector 370 may additionally be referred to as an x-ray sensor.

The object 180 may be any suitable object to be imaged. In an exemplary embodiment, the object may be the anatomy of a patient. More specifically, the anatomy to be imaged may include chest, abdomen, the pelvic region, neck, legs, head, feet, a region with cardiac vasculature, or a region containing the peripheral vasculature of a patient and may include various anatomical structures such as, but not limited to, organs, tissue, blood vessels and blood, gases, or any other anatomical structures or objects. In other embodiments, the object may be or include man-made structures.

In some embodiments, the x-ray imaging system 151 may be configured to obtain x-ray images without contrast. In some embodiments, the x-ray imaging system 151 may be configured to obtain x-ray images with contrast (e.g., angiogram or venogram). In such embodiments, a contrast agent or x-ray dye may be introduced to a patient's anatomy before imaging. The contrast agent may also be referred to as a radiocontrast agent, contrast material, contrast dye, or contrast media. The contrast dye may be of any suitable material, chemical, or compound and may be a liquid, powder, paste, tablet, or of any other suitable form. For example, the contrast dye may be iodine-based compounds, barium sulfate compounds, gadolinium-based compounds, or any other suitable compounds. The contrast agent may be used to enhance the visibility of internal fluids or structures within a patient's anatomy. The contrast agent may absorb external x-rays, resulting in decreased exposure on the x-ray detector 170.

In some embodiments, the extraluminal imaging system 151 could be any suitable extraluminal imaging device, such as computed tomography (CT) or magnetic resonance imaging (MRI).

When the control system 130 is in communication with the x-ray system 151, the communication interface 140 facilitates communication of signals between the control system 130 and the x-ray device 152. This communication includes providing control commands to the x-ray source 160 and/or the x-ray detector 170 of the x-ray device 152 and receiving data from the x-ray device 152. In some embodiments, the communication interface 140 performs preliminary processing of the x-ray data prior to relaying the data to the processor 134. In examples of such embodiments, the communication interface 140 may perform amplification, filtering, and/or aggregating of the data. In an embodiment, the communication interface 140 also supplies high- and low-voltage DC power to support operation of the device 152 including circuitry within the device.

The processor 134 receives the x-ray data from the x-ray device 152 by way of the communication interface 140 and processes the data to reconstruct an image of the anatomy being imaged. The processor 134 outputs image data such that an image is displayed on the display 132. In an embodiment in which the contrast agent is introduced to the anatomy of a patient and a venogram is to be generated, the particular areas of interest to be imaged may be one or more blood vessels or other section or part of the human vasculature. The contrast agent may identify fluid filled structures, both natural and/or man-made, such as arteries or veins of a patient's vascular system, including cardiac vasculature, peripheral vasculature, neural vasculature, renal vasculature, and/or any other suitable lumen inside the body. For example, the x-ray device 152 may be used to examine any number of anatomical locations and tissue types, including without limitation all the organs, fluids, or other structures or parts of an anatomy previously mentioned. In addition to natural structures, the x-ray device 152 may be used to examine man-made structures such as any of the previously mentioned structures.

The processor 134 may be configured to receive an x-ray image that was stored by the x-ray imaging device 152 during a clinical procedure. The images may be further enhanced by other information such as patient history, patient record, IVUS imaging, pre-operative ultrasound imaging, pre-operative CT, or any other suitable data.

Figure 1C:
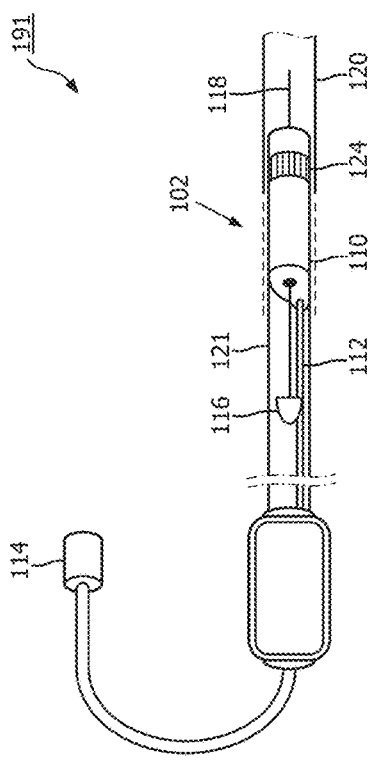
FIG. 1C is a schematic diagram of an intraluminal imaging device, according to aspects of the present disclosure.

FIG. 1C is a schematic diagram of an intraluminal imaging device 102, according to aspects of the present disclosure. FIG. 1C illustrates aspects of the intraluminal imaging system 191, including an intraluminal imaging device 102 and related components. As described above, the intraluminal imaging system 191 may be incorporated into various systems of the broader system 100. In addition, the intraluminal imaging system 191 may include additional components than those pictured in FIG. 1C. In some implementations, the intraluminal imaging device 102 may be a catheter or a guidewire.

The intraluminal imaging system 191 can be an ultrasound imaging system. In some instances, the intraluminal imaging system. The intraluminal imaging system 191 can be an intravascular ultrasound (IVUS) imaging system. The intraluminal imaging system 191 may include an intraluminal imaging device 102, such as a catheter, guide wire, or guide catheter, in communication with the control system 130. The control system 130 may include a display 132, a processor 134, and a communication interface 140 among other components. The intraluminal imaging device 102 can be an ultrasound imaging device. In some instances, the device 102 can be an IVUS imaging device, such as a solid-state IVUS device.

At a high level, the IVUS device 102 emits ultrasonic energy from a transducer array 124 included in a scanner assembly, also referred to as an IVUS imaging assembly, mounted near a distal end of the catheter device. The ultrasonic energy is reflected by tissue structures in the surrounding medium, such as a vessel 120, or another body lumen surrounding the scanner assembly 110, and the ultrasound echo signals are received by the transducer array 124. In that regard, the device 102 can be sized, shaped, or otherwise configured to be positioned within the body lumen of a patient. The communication interface 140 transfers the received echo signals to the processor 134 of the control system 130 where the ultrasound image (including flow information in some embodiments) is reconstructed and displayed on the display 132. The control system 130, including the processor 134, can be operable to facilitate the features of the IVUS imaging system 191 described herein. For example, the processor 134 can execute computer readable instructions stored on the non-transitory tangible computer readable medium.

The communication interface 140 facilitates communication of signals between the control system 130 and the scanner assembly 110 included in the IVUS device 102. This communication includes the steps of: (1) providing commands to integrated circuit controller chip(s) included in the scanner assembly 110 to select the particular transducer array element(s), or acoustic element(s), to be used for transmit and receive, (2) providing the transmit trigger signals to the integrated circuit controller chip(s) included in the scanner assembly 110 to activate the transmitter circuitry to generate an electrical pulse to excite the selected transducer array element(s), and/or (3) accepting amplified echo signals received from the selected transducer array element (s) via amplifiers included on the integrated circuit controller chip(s) of the scanner assembly 110. In some embodiments, the communication interface 140 performs preliminary processing of the echo data prior to relaying the data to the processor 134. In examples of such embodiments, the communication interface 140 performs amplification, filtering, and/or aggregating of the data. In an embodiment, the communication interface 140 also supplies high- and low-voltage DC power to support operation of the device 102 including circuitry within the scanner assembly 110.

The processor 134 receives the echo data from the scanner assembly 110 by way of the communication interface 140 and processes the data to reconstruct an image of the tissue structures in the medium surrounding the scanner assembly 110. The processor 134 outputs image data such that an image of the lumen 120, such as a cross-sectional image of the vessel 120, is displayed on the display 132. The lumen 120 may represent fluid filled or surrounded structures, both natural and man-made. The lumen 120 may be within a body of a patient. The lumen 120 may be a blood vessel, such as an artery or a vein of a patient's vascular system, including cardiac vasculature, peripheral vasculature, neural vasculature, renal vasculature, and/or any other suitable lumen inside the body. For example, the device 102 may be used to examine any number of anatomical locations and tissue types, including without limitation, organs including the liver, heart, kidneys, gall bladder, pancreas, lungs; ducts; intestines; nervous system structures including the brain, dural sac, spinal cord and peripheral nerves; the urinary tract; as well as valves within the blood, chambers or other parts of the heart, and/or other systems of the body. In addition to natural structures, the device 102 may be used to examine man-made structures such as, but without limitation, heart valves, stents, shunts, filters and other devices.

In some embodiments, the IVUS device includes some features similar to traditional solid-state IVUS catheters, such as the EagleEye® catheter, Visions PV 0.014P RX catheter, Visions PV 0.018 catheter, Visions PV 0.035, and Pioneer Plus catheter, each of which are available from Koninklijke Philips N.V, and those disclosed in U.S. Pat. No. 7,846,191 hereby incorporated by reference in its entirety. For example, the IVUS device 102 includes the scanner assembly 110 near a distal end of the device 102 and a transmission line bundle 112 extending along the longitudinal body of the device 102. The transmission line bundle or cable 112 can include a plurality of conductors, including one, two, three, four, five, six, seven, or more conductors. It is understood that any suitable gauge wire can be used for the conductors. In an embodiment, the cable 112 can include a four-conductor transmission line arrangement with, e.g., 41 AWG gauge wires. In an embodiment, the cable 112 can include a seven-conductor transmission line arrangement utilizing, e.g., 44 AWG gauge wires. In some embodiments, 43 AWG gauge wires can be used.

The transmission line bundle 112 terminates in a patient interface module (PIM) connector 114 at a proximal end of the device 102. The PIM connector 114 electrically couples the transmission line bundle 112 to the communication interface 140 and physically couples the IVUS device 102 to the communication interface 140. In some embodiments, the communication interface 140 may be a PIM. In an embodiment, the IVUS device 102 further includes a guide wire exit port 116. Accordingly, in some instances the IVUS device 102 is a rapid-exchange catheter. The guide wire exit port 116 allows a guide wire 118 to be inserted towards the distal end to direct the device 102 through the vessel 120.

In some embodiments, the intraluminal imaging device 102 may acquire intravascular images of any suitable imaging modality, including optical coherence tomography (OCT) and intravascular photoacoustic (IVPA).

Figure 2:
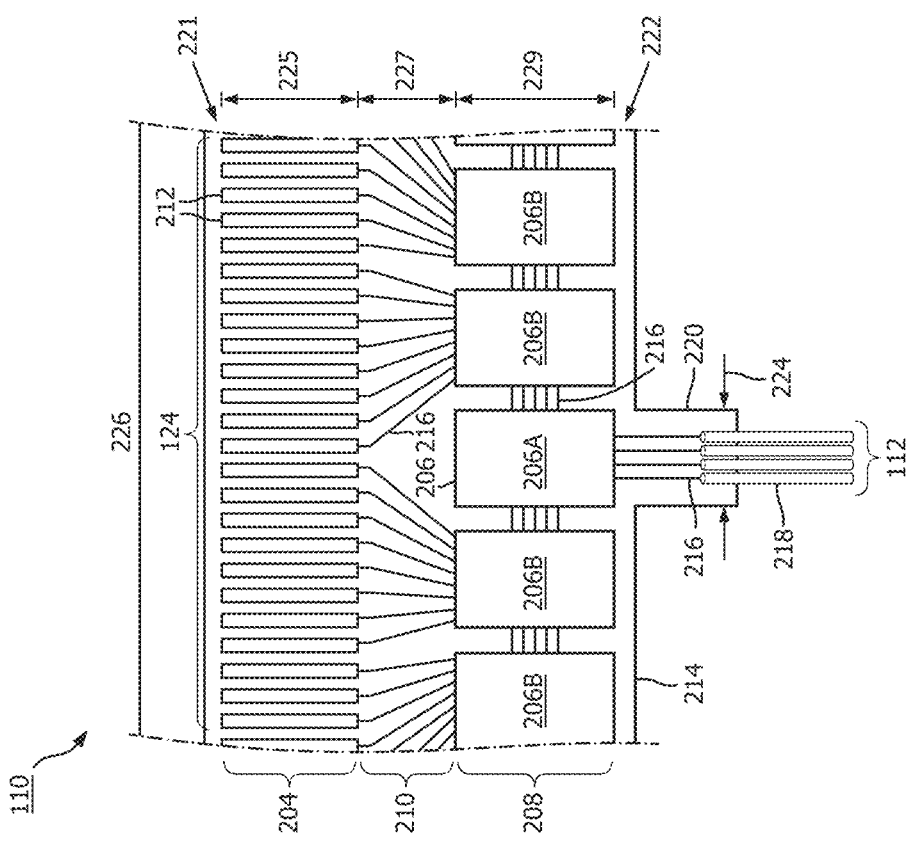
FIG. 2 is a diagrammatic top view of an ultrasound imaging assembly in a flat configuration, according to aspects of the present disclosure.

FIG. 2 is a diagrammatic top view of an ultrasound imaging assembly in a flat configuration, according to aspects of the present disclosure. The flexible assembly 110 includes a transducer array 124 formed in a transducer region 204 and transducer control logic dies 206 (including dies 206A and 206B) formed in a control region 208, with a transition region 210 disposed therebetween. The transducer array 124 includes an array of ultrasound transducer elements 212. The transducer control logic dies 206 are mounted on a flexible substrate 214 into which the transducer elements 212 have been previously integrated. The flexible substrate 214 is shown in a flat configuration in FIG. 2. Though six control logic dies 206 are shown in FIG. 2, any number of control logic dies 206 may be used. For example, one, two, three, four, five, six, seven, eight, nine, ten, or more control logic dies 206 may be used.

The flexible substrate 214, on which the transducer control logic dies 206 and the transducer elements 212 are mounted, provides structural support and interconnects for electrical coupling. The flexible substrate 214 may be constructed to include a film layer of a flexible polyimide material such as KAPTON™ (trademark of DuPont). Other suitable materials include polyester films, polyimide films, polyethylene napthalate films, or polyetherimide films, liquid crystal polymer, other flexible printed semiconductor substrates as well as products such as Upilex® (registered trademark of Ube Industries) and TEFLON® (registered trademark of E.I. du Pont). In the flat configuration illustrated in FIG. 2, the flexible substrate 214 has a generally rectangular shape. As shown and described herein, the flexible substrate 214 is configured to be wrapped around a support member 230 (FIG. 3) in some instances. Therefore, the thickness of the film layer of the flexible substrate 214 is generally related to the degree of curvature in the final assembled flexible assembly 110. In some embodiments, the film layer is between 5 µm and 100 µm, with some particular embodiments being between 5 µm and 25.1 µm e.g., 6 µm.

The set of transducer control logic dies 206 is a non-limiting example of a control circuit. The transducer region 204 is disposed at a distal portion 221 of the flexible substrate 214. The control region 208 is disposed at a proximal portion 222 of the flexible substrate 214. The transition region 210 is disposed between the control region 208 and the transducer region 204. Dimensions of the transducer region 204, the control region 208, and the transition region 210 (e.g., lengths 225, 227, 229) can vary in different embodiments. In some embodiments, the lengths 225, 227, 229 can be substantially similar or, the length 227 of the transition region 210 may be less than lengths 225 and 229, the length 227 of the transition region 210 can be greater than lengths 225, 229 of the transducer region and controller region, respectively.

The control logic dies 206 are not necessarily homogenous. In some embodiments, a single controller is designated a master control logic die 206A and contains the communication interface for cable 112, between a processing system, e.g., processing system 106, and the flexible assembly 110. Accordingly, the master control circuit may include control logic that decodes control signals received over the cable 112, transmits control responses over the cable 112, amplifies echo signals, and/or transmits the echo signals over the cable 112. The remaining controllers are slave controllers 206B. The slave controllers 206B may include control logic that drives a plurality of transducer elements 512 positioned on a transducer element 212 to emit an ultrasonic signal and selects a transducer element 212 to receive an echo. In the depicted embodiment, the master controller 206A does not directly control any transducer elements 212. In other embodiments, the master controller 206A drives the same number of transducer elements 212 as the slave controllers 206B or drives a reduced set of transducer elements 212 as compared to the slave controllers 206B. In an exemplary embodiment, a single master controller 206A and eight slave controllers 206B are provided with eight transducers assigned to each slave controller 206B.

To electrically interconnect the control logic dies 206 and the transducer elements 212, in an embodiment, the flexible substrate 214 includes conductive traces 216 formed in the film layer that carry signals between the control logic dies 206 and the transducer elements 212. In particular, the conductive traces 216 providing communication between the control logic dies 206 and the transducer elements 212 extend along the flexible substrate 214 within the transition region 210. In some instances, the conductive traces 216 can also facilitate electrical communication between the master controller 206A and the slave controllers 206B. The conductive traces 216 can also provide a set of conductive pads that contact the conductors 218 of cable 112 when the conductors 218 of the cable 112 are mechanically and electrically coupled to the flexible substrate 214. Suitable materials for the conductive traces 216 include copper, gold, aluminum, silver, tantalum, nickel, and tin, and may be deposited on the flexible substrate 214 by processes such as sputtering, plating, and etching. In an embodiment, the flexible substrate 214 includes a chromium adhesion layer. The width and thickness of the conductive traces 216 are selected to provide proper conductivity and resilience when the flexible substrate 214 is rolled. In that regard, an exemplary range for the thickness of a conductive trace 216 and/or conductive pad is between 1-5 µm. For example, in an embodiment, 5 µm conductive traces 216 are separated by 5 µm of space. The width of a conductive trace 216 on the flexible substrate may be further determined by the width of the conductor 218 to be coupled to the trace or pad.

The flexible substrate 214 can include a conductor interface 220 in some embodiments. The conductor interface 220 can be in a location of the flexible substrate 214 where the conductors 218 of the cable 112 are coupled to the flexible substrate 214. For example, the bare conductors of the cable 112 are electrically coupled to the flexible substrate 214 at the conductor interface 220. The conductor interface 220 can be tab extending from the main body of flexible substrate 214. In that regard, the main body of the flexible substrate 214 can refer collectively to the transducer region 204, controller region 208, and the transition region 210. In the illustrated embodiment, the conductor interface 220 extends from the proximal portion 222 of the flexible substrate 214. In other embodiments, the conductor interface 220 is positioned at other parts of the flexible substrate 214, such as the distal portion 221, or the flexible substrate 214 may lack the conductor interface 220. A value of a dimension of the tab or conductor interface 220, such as a width 224, can be less than the value of a dimension of the main body of the flexible substrate 214, such as a width 226. In some embodiments, the substrate forming the conductor interface 220 is made of the same material(s) and/or is similarly flexible as the flexible substrate 214. In other embodiments, the conductor interface 220 is made of different materials and/or is comparatively more rigid than the flexible substrate 214. For example, the conductor interface 220 can be made of a plastic, thermoplastic, polymer, hard polymer, etc., including polyoxymethylene (e.g., DELRIN®), polyether ether ketone (PEEK), nylon, Liquid Crystal Polymer (LCP), and/ or other suitable materials.

Figure 3:
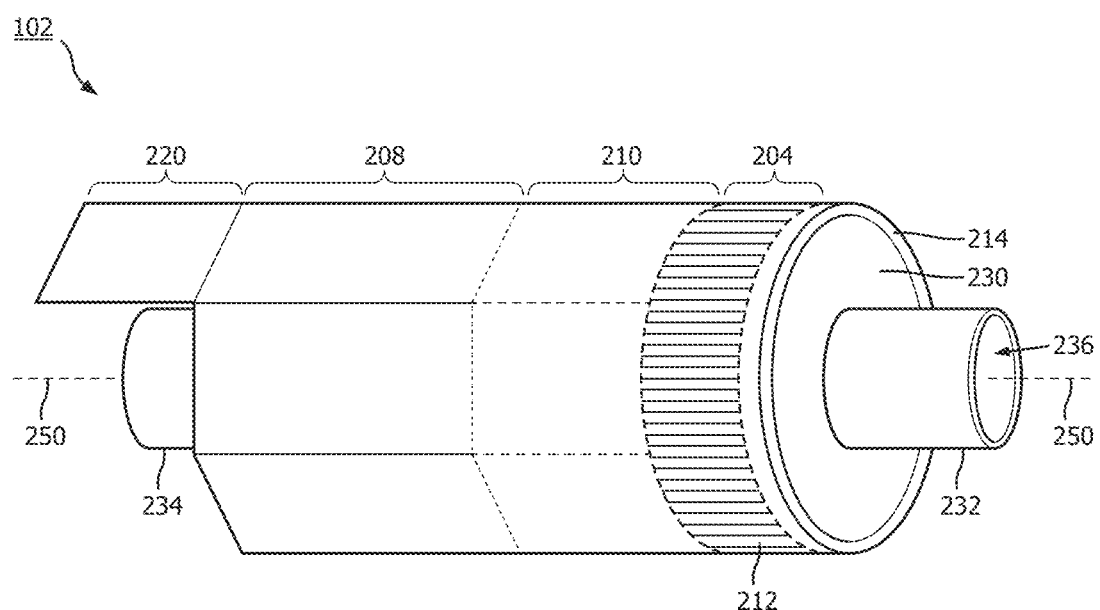
FIG. 3 is a diagrammatic perspective view of the ultrasound imaging assembly in a rolled configuration around a support member, according to aspects of the present disclosure.

FIG. 3 is a diagrammatic perspective view of the ultrasound imaging assembly in a rolled configuration around a support member, according to aspects of the present disclosure. FIG. 3 illustrates a perspective view of the scanner assembly 110 in a rolled configuration. In some instances, the flexible substrate 214 is transitioned from a flat configuration (FIG. 2) to a rolled or more cylindrical configuration (FIG. 3). For example, in some embodiments, techniques are utilized as disclosed in one or more of U.S. Pat. No. 6,776,763, titled "ULTRASONIC TRANSDUCER ARRAY AND METHOD OF MANUFACTURING THE SAME" and U.S. Pat. No. 7,226,417, titled "HIGH RESOLUTION INTRAVASCULAR ULTRASOUND SENSING ASSEMBLY HAVING A FLEXIBLE SUBSTRATE," each of which is hereby incorporated by reference in its entirety.

Depending on the application and embodiment of the presently disclosed invention, transducer elements 212 may be piezoelectric transducers, single crystal transducer, or PZT (lead zirconate titanate) transducers. In other embodiments, the transducer elements of transducer array 124 may be flexural transducers, piezoelectric micromachined ultrasonic transducers (PMUTs), capacitive micromachined ultrasonic transducers (CMUTs), or any other suitable type of transducer element. In such embodiments, transducer elements 212 may comprise an elongate semiconductor material or other suitable material that allows micromachining or similar methods of disposing extremely small elements or circuitry on a substrate.

In some embodiments, the transducer elements 212 and the controllers 206 can be positioned in an annular configuration, such as a circular configuration or in a polygon configuration, around a longitudinal axis 250 of a support member 230. It is understood that the longitudinal axis 250 of the support member 230 may also be referred to as the longitudinal axis of the scanner assembly 110, the flexible elongate member 121, or the device 102. For example, a cross-sectional profile of the imaging assembly 110 at the transducer elements 212 and/or the controllers 206 can be a circle or a polygon. Any suitable annular polygon shape can be implemented, such as one based on the number of controllers or transducers, flexibility of the controllers or transducers, etc. Some examples may include a pentagon, hexagon, heptagon, octagon, nonagon, decagon, etc. In some examples, the transducer controllers 206 may be used for controlling the ultrasound transducers 512 of transducer elements 212 to obtain imaging data associated with the vessel 120.

The support member 230 can be referenced as a unibody in some instances. The support member 230 can be composed of a metallic material, such as stainless steel, or a non-metallic material, such as a plastic or polymer as described in U.S. Provisional Application No. 61/985,220, "Pre-Doped Solid Substrate for Intravascular Devices," filed Apr. 28, 2014, the entirety of which is hereby incorporated by reference herein. In some embodiments, support member 230 may be composed of 303 stainless steel. The support member 230 can be a ferrule having a distal flange or portion 232 and a proximal flange or portion 234. The support member 230 can be tubular in shape and define a lumen 236 extending longitudinally therethrough. The lumen 236 can be sized and shaped to receive the guide wire 118. The support member 230 can be manufactured using any suitable process. For example, the support member 230 can be machined and/or electrochemically machined or laser milled, such as by removing material from a blank to shape the support member 230, or molded, such as by an injection molding process or a micro injection molding process.

Figure 4:
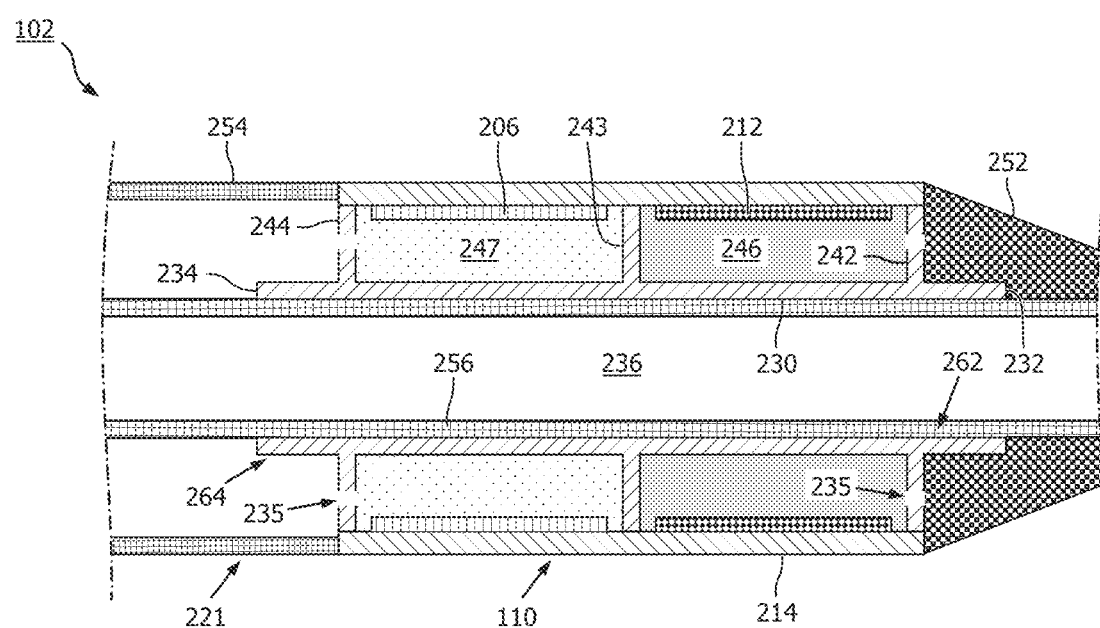
FIG. 4 is a diagrammatic cross-sectional side view of the ultrasound imaging assembly, according to aspects of the present disclosure.

FIG. 4 is a diagrammatic cross-sectional side view of the ultrasound imaging assembly, according to aspects of the present disclosure. The intraluminal imaging device 102 may include the flexible substrate 214 and the support member 230, according to aspects of the present disclosure. The lumen 236 may be connected with the entry/exit port 116 and is sized and shaped to receive the guide wire 118 (FIG. 1). In some embodiments, the support member 230 may be integrally formed as a unitary structure, while in other embodiments the support member 230 may be formed of different components, such as a ferrule and stands 242, 243, and 244, that are fixedly coupled to one another. In some cases, the support member 230 and/or one or more components thereof may be completely integrated with inner member 256. In some cases, the inner member 256 and the support member 230 may be joined as one, e.g., in the case of a polymer support member.

Stands 242, 243, and 244 that extend vertically are provided at the distal, central, and proximal portions respectively, of the support member 230. The stands 242, 243, and 244 elevate and support the distal, central, and proximal portions of the flexible substrate 214. In that regard, portions of the flexible substrate 214, such as the transducer portion 204 (or transducer region 204), can be spaced from a central body portion of the support member 230 extending between the stands 242, 243, and 244. The stands 242, 243, 244 can have the same outer diameter or different outer diameters. For example, the distal stand 242 can have a larger or smaller outer diameter than the central stand 243 and/or proximal stand 244 and can also have special features for rotational alignment as well as control chip placement and connection.

To improve acoustic performance, the cavity between the transducer array 212 and the surface of the support member 230 may be filled with an acoustic backing material 246. The liquid backing material 246 can be introduced between the flexible substrate 214 and the support member 230 via passageway 235 in the stand 242, or through additional recesses as will be discussed in more detail hereafter. The backing material 246 may serve to attenuate ultrasound energy emitted by the transducer array 212 that propagates in the undesired, inward direction.

The cavity between the circuit controller chips 206 and the surface of the support member 230 may be filled with an underfill material 247. The underfill material 247 may be an adhesive material (e.g. an epoxy) which provides structural support for the circuit controller chips 206 and/or the flexible substrate 214. The underfill 247 may additionally be any suitable material.

In some embodiments, the central body portion of the support member can include recesses allowing fluid communication between the lumen of the unibody and the cavities between the flexible substrate 214 and the support member 230. Acoustic backing material 246 and/or underfill material 247 can be introduced via the cavities (during an assembly process, prior to the inner member 256 extending through the lumen of the unibody. In some embodiments, suction can be applied via the passageways 235 of one of the stands 242, 244, or to any other suitable recess while the liquid backing material 246 is fed between the flexible substrate 214 and the support member 230 via the passageways 235 of the other of the stands 242, 244, or any other suitable recess. The backing material can be cured to allow it to solidify and set. In various embodiments, the support member 230 includes more than three stands 242, 243, and 244, only one or two of the stands 242, 243, 244, or none of the stands. In that regard the support member 230 can have an increased diameter distal portion 262 and/or increased diameter proximal portion 264 that is sized and shaped to elevate and support the distal and/or proximal portions of the flexible substrate 214.

The support member 230 can be substantially cylindrical in some embodiments. Other shapes of the support member 230 are also contemplated including geometrical, non-geometrical, symmetrical, non-symmetrical, cross-sectional profiles. As the term is used herein, the shape of the support member 230 may reference a cross-sectional profile of the support member 230. Different portions of the support member 230 can be variously shaped in other embodiments. For example, the proximal portion 264 can have a larger outer diameter than the outer diameters of the distal portion 262 or a central portion extending between the distal and proximal portions 262, 264. In some embodiments, an inner diameter of the support member 230 (e.g., the diameter of the lumen 236) can correspondingly increase or decrease as the outer diameter changes. In other embodiments, the inner diameter of the support member 230 remains the same despite variations in the outer diameter.

A proximal inner member 256 and a proximal outer member 254 are coupled to the proximal portion 264 of the support member 230. The proximal inner member 256 and/or the proximal outer member 254 can comprise a flexible elongate member. The proximal inner member 256 can be received within a proximal flange 234. The proximal outer member 254 abuts and is in contact with the proximal end of flexible substrate 214. A distal tip member 252 is coupled to the distal portion 262 of the support member 230. For example, the distal member 252 is positioned around the distal flange 232. The tip member 252 can abut and be in contact with the distal end of flexible substrate 214 and the stand 242. In other embodiments, the proximal end of the tip member 252 may be received within the distal end of the flexible substrate 214 in its rolled configuration. In some embodiments there may be a gap between the flexible substrate 214 and the tip member 252. The distal member 252 can be the distal-most component of the intraluminal imaging device 102. The distal tip member 252 may be a flexible, polymeric component that defines the distal-most end of the imaging device 102. The distal tip member 252 may additionally define a lumen in communication with the lumen 236 defined by support member 230. The guide wire 118 may extend through lumen 236 as well as the lumen defined by the tip member 252.

One or more adhesives can be disposed between various components at the distal portion of the intraluminal imaging device 102. For example, one or more of the flexible substrate 214, the support member 230, the distal member 252, the proximal inner member 256, the transducer array 212, and/or the proximal outer member 254 can be coupled to one another via an adhesive. Stated differently, the adhesive can be in contact with e.g. the transducer array 212, the flexible substrate 214, the support member 230, the distal member 252, the proximal inner member 256, and/or the proximal outer member 254, among other components.

Figure 5:
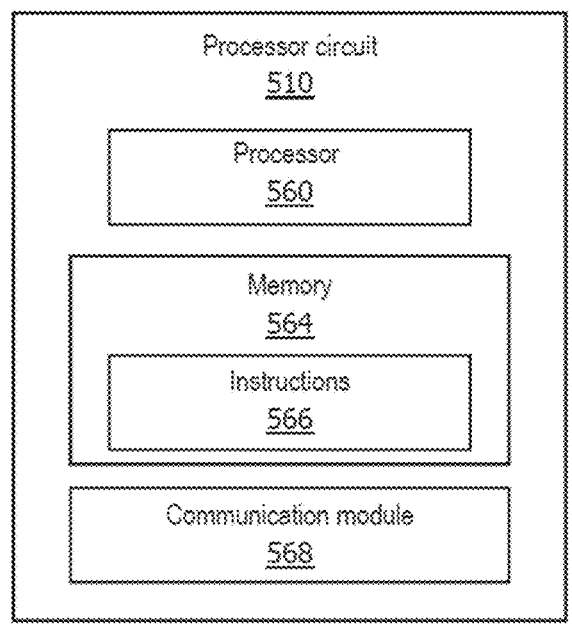
FIG. 5 is a schematic diagram of a processor circuit, according to aspects of the present disclosure.

FIG. 5 is a schematic diagram of a processor circuit, according to aspects of the present disclosure. The processor circuit 510 may be implemented in the control system 130 of FIG. 1A, the intraluminal imaging system 191, the physiology measurement system 101, and/or the x-ray imaging system 151, or any other suitable location. In an example, the processor circuit 510 may be in communication with intraluminal imaging device 102, the x-ray imaging device 152, the pressure-sensing guidewire and/or catheter described above, and/or the display 132 within the system 100. The processor circuit 510 may include the processor 134 and/or the communication interface 140 (FIG. 1A). One or more processor circuits 510 are configured to execute the operations described herein. As shown, the processor circuit 510 may include a processor 560, a memory 564, and a communication module 568. These elements may be in direct or indirect communication with each other, for example via one or more buses.

The processor 560 may include a CPU, a GPU, a DSP, an application-specific integrated circuit (ASIC), a controller, an FPGA, another hardware device, a firmware device, or any combination thereof configured to perform the operations described herein. The processor 560 may also be implemented as a combination of computing devices, e.g., a combination of a DSP and a microprocessor, a plurality of microprocessors, one or more microprocessors in conjunction with a DSP core, or any other such configuration.

The memory 564 may include a cache memory (e.g., a cache memory of the processor 560), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an embodiment, the memory 564 includes a non-transitory computer-readable medium. The memory 564 may store instructions 566. The instructions 566 may include instructions that, when executed by the processor 560, cause the processor 560 to perform the operations described herein with reference to the probe 110 and/or the host 130 (FIG. 1). Instructions 566 may also be referred to as code. The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may include a single computer-readable statement or many computer-readable statements.

The communication module 568 can include any electronic circuitry and/or logic circuitry to facilitate direct or indirect communication of data between the processor circuit 510, the probe 110, and/or the display 132 and/or display 132. In that regard, the communication module 568 can be an input/output (I/O) device. In some instances, the communication module 568 facilitates direct or indirect communication between various elements of the processor circuit 510 and/or the probe 110 (FIG. 1C) and/or the host 130 (FIG. 1A).

Figure 6:
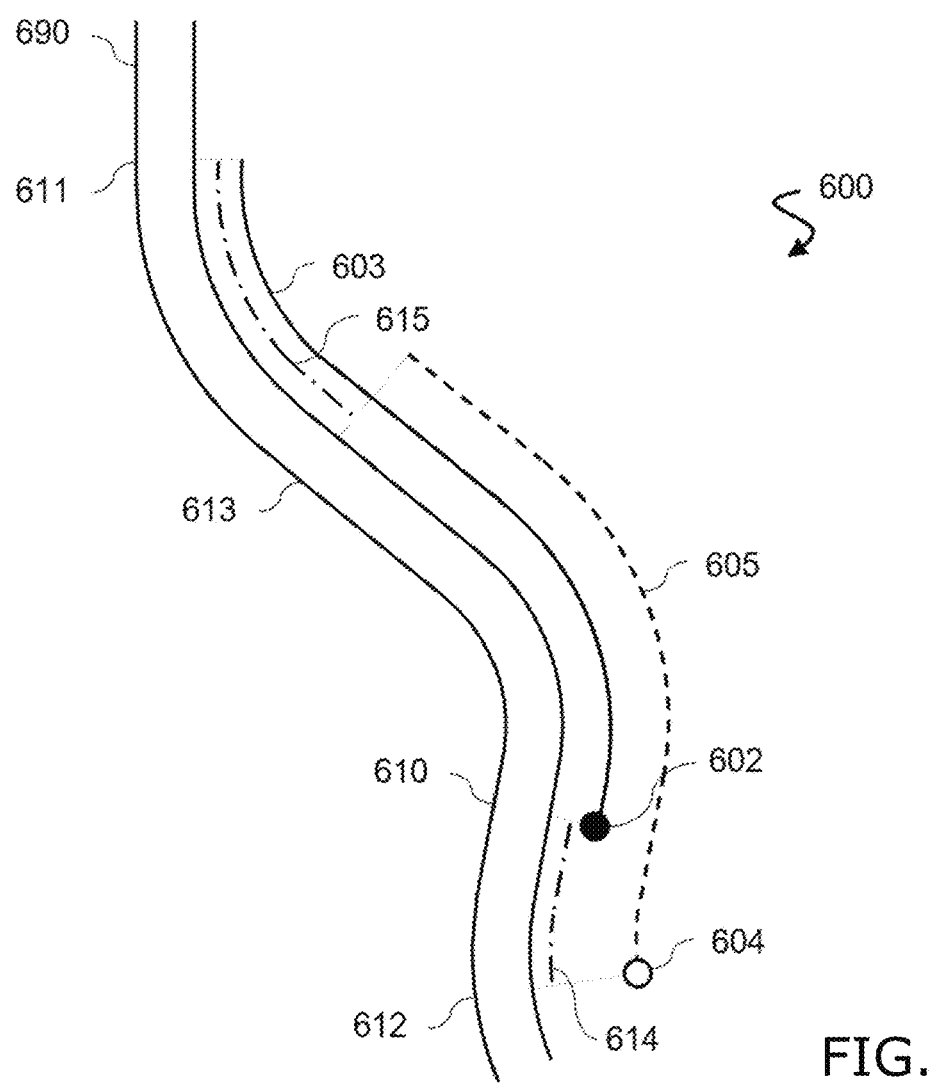
FIG. 6 is a diagrammatic view of a region of a patient vasculature, according to aspects of the present disclosure.

FIG. 6 is a diagrammatic view of a region 600 of a patient vasculature, according to aspects of the present disclosure. Shown in FIG. 6 is a view of a vessel 690 measured with the physiology measurement system 101 and the intraluminal imaging system 191. A physiology measurement procedure may be completed before or after an intraluminal imaging procedure.

In one example, a physiology measurement procedure may be performed. During this procedure, a pressure-sensing device of the physiology measurement system 101 may be positioned within the vessel 690. For example, the pressure-sensing catheter may be positioned at a location 611 within the vessel 690. The distal pressure sensor of the pressure-sensing guidewire may be positioned at a starting location 610 as shown by the dot 602. During the pressure sensing procedure, the distal pressure sensor of the pressure-sensing guidewire may be moved from the location 610 to the location 611 within the vessel 690. As the guidewire is pulled from the position 610 to the position 611, the distal sensor may acquire pressure measurements. The proximal pressure sensor of the stationary catheter positioned at the location 611 may also collect pressure measurements. For each location along the vessel 690 through which the distal sensor of the guidewire traveled, a pressure ratio may be calculated and associated with that location along the vessel 690 as will be described with reference to FIG. 7.

A pathway 603 is shown adjacent to the vessel 690 in FIG. 6. The pathway 603 may illustrate the shape and length of the path of the distal pressure sensor of the guidewire through the pullback, except that the distal pressure sensor of the guidewire traveled within the vessel 690 rather than next to the lumen. This pathway 603 may be positioned within the vessel 690 or at any other location.

An intraluminal imaging procedure may also be performed, for example with an intravascular ultrasound (IVUS) imaging system including an IVUS imaging device or catheter, such as the device 102 (FIG. 1C). During this procedure, the IVUS imaging device 102 of the intraluminal imaging system 191 may be positioned within the vessel 690. For example, the device 102 may be positioned at a location 612 within the vessel 690. This location may be a starting position of the device 102 as shown by the dot 604. During the intraluminal imaging procedure, the device 102 may be moved from the location 612 to the location 613 within the vessel 690. As the intraluminal imaging device 102 is pulled from the position 612 to the position 613, the device 102 may acquire intraluminal ultrasound data. The intraluminal ultrasound data acquired at a particular position along the path 605 traveled by the intraluminal imaging device 102 may be received by the control system 130 and used to create a radial, cross-sectional image (e.g., an IVUS image) of the vessel 690 at that location. For each location along the vessel 690 through which the device 102 traveled, an IVUS image may be generated and associated with that location along the vessel 690 as will be described with reference to FIG. 8.

The pathway 605 is shown adjacent to the vessel 690 in FIG. 6. The pathway 605 may illustrate the shape and length of the path of the intraluminal imaging device 102 of the intraluminal imaging system 191 through the pullback, except that the device 102 traveled within the vessel 690 rather than next to the lumen. This pathway 605 may be positioned within the vessel 690 or at any other location.

As shown in FIG. 6, the starting location of the pressure sensor of the guidewire (e.g., position 610) and the starting location of the intraluminal imaging device 102 (e.g., position 612) may not be the same position. For example, the location 612 corresponding to the starting location of the IVUS imaging device 102 may be at some position distal (as shown in FIG. 6) or proximal of the starting position of the pressure-sensing guidewire. Similarly, the ending location of the pressure guidewire (e.g., position 611) may be at a different location as the ending location of the device 102 (e.g., position 613). As a result, there may be regions of the vessel 690 which were only either imaged by the imaging device 102 (e.g., region 614 in the example shown in FIG. 6) or measured by the pressure sensing guidewire (e.g., region 615 in the example shown in FIG. 6).

In some embodiments, the starting location of the pressure sensor of the guidewire and the starting location of the intraluminal imaging device 102 may be the same position. Similarly, the ending location of the pressure guidewire may be at the same location as the ending location of the device 102. As a result, all regions of the vessel 690 which were imaged by the imaging device 102 may also have been measured by the pressure sensing guidewire.

Figure 7:
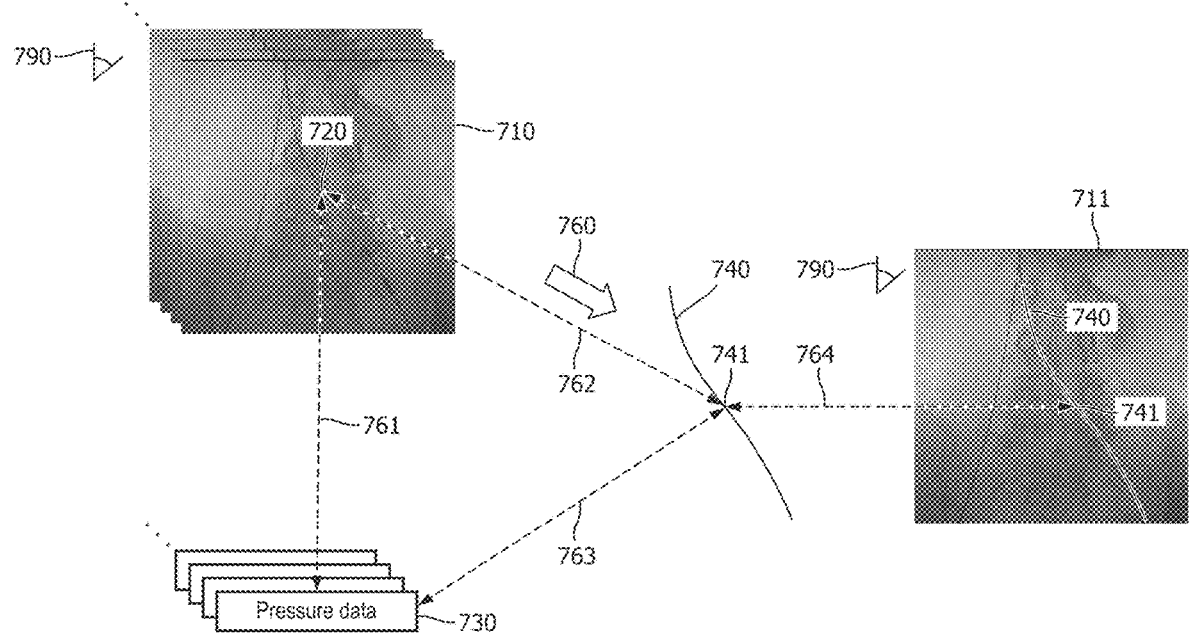
FIG. 7 is a diagrammatic view of a relationship between x-ray fluoroscopy images, pressure data, and a path defined by the motion of an intravascular device, according to aspects of the present disclosure.
Figure 8:
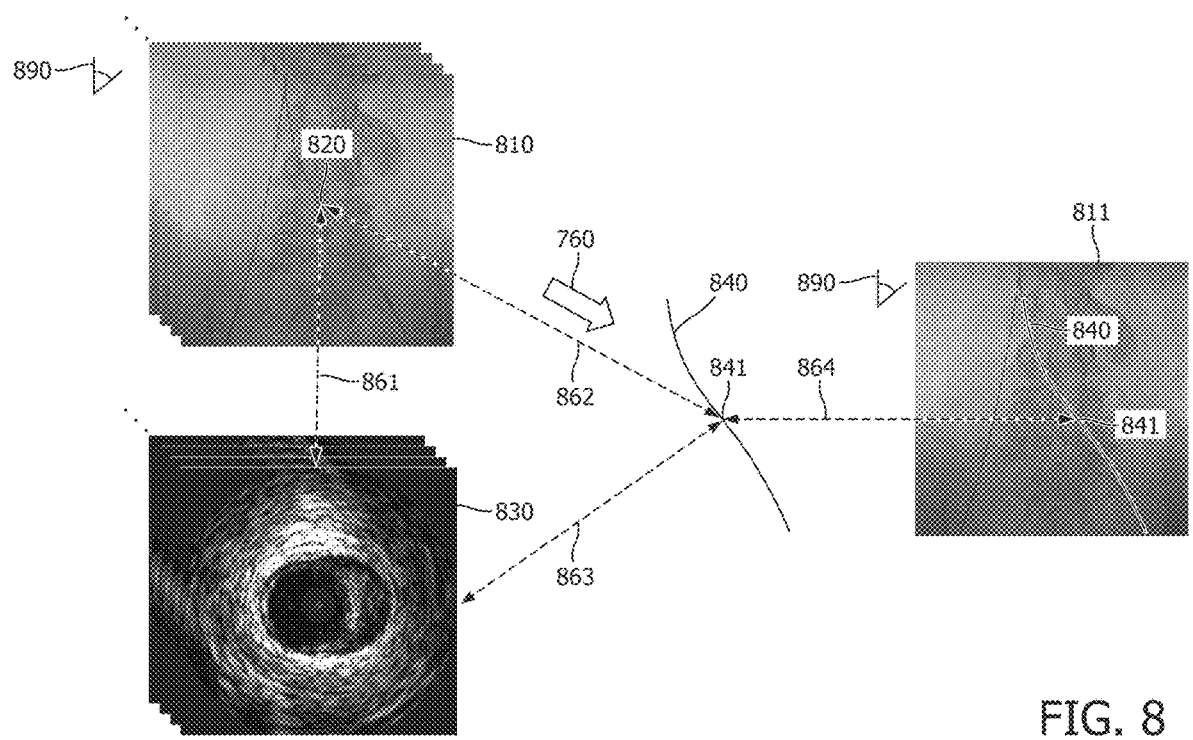
FIG. 8 is a diagrammatic view of a relationship between x-ray fluoroscopy images, intravascular ultrasound images, and a path defined by the motion of an intravascular device, according to aspects of the present disclosure.

Referring now to FIG. 7 and FIG. 8, aspects of coregistering pressure data and intravascular images to an extraluminal image (e.g., an angiogram image) are disclosed. In some embodiments, the system uses physiology co-registration to an angiogram as a first step to establish the length of the physiology pullback. The system then co-registers an IVUS pullback to the same angiogram establishing its length. The system then uses the lengths of these pullbacks as well as their starting locations to co-register the physiology data to a calibrated longitudinal cross section of the IVUS pullback. In some embodiments, the registration of physiological data, intravascular data, and an angiogram image may be referred to as tri-registration. In some embodiments, tri-registration may refer to the correlation of three separate imaging modalities. Each of these modalities may be displayed simultaneously.

FIG. 7 is a diagrammatic view of a relationship between x-ray fluoroscopy images 710, pressure data 730, and a path 740 defined by the motion of an intravascular device, according to aspects of the present disclosure. FIG. 7 describes a method of coregistering physiology data 730 including pressure ratio data or iFR measurements with corresponding locations on one or more fluoroscopy images 710 of the same region of a patient's anatomy.

Various aspects of coregistering physiological data to an extraluminal image may include one or more features described in U.S. Patent Publication No. 2006/0241465, filed Jan. 11, 2006, and titled "Vascular Image Co-registration" which is hereby incorporated by reference in its entirety.

The patient anatomy may be imaged with an x-ray device while a physician performs a pullback with a pressure-sensing device, e.g., while the pressure-sensing guidewire moves through a blood vessel of the anatomy. The pressure-sensing guidewire may be substantially similar to the pressure-sensing guidewire described with reference to FIG. 1A. The x-ray device used to obtain the fluoroscopy images 710 may be substantially similar to the x-ray device 152 of FIG. 1B. In some embodiments, the fluoroscopy images 710 may be obtained while no contrast agent is present within the patient vasculature. Such an embodiment is shown by the fluoroscopy images 710 in FIG. 7. In other embodiments, a contrast agent is present within the patient vasculature. In that regard, the fluoroscopy images 810 may alternatively be angiogram images or any suitable type of extraluminal images. The radiopaque portion of the intravascular device 720 is visible within the fluoroscopy image 710. The fluoroscopy images 710 may correspond to a continuous image stream of fluoroscopy images and may be obtained as the patient anatomy is exposed to a reduced dose of x-radiation. It is noted that the fluoroscopy images 710 may be acquired with the x-ray source 160 and the x-ray detector 170 positioned at any suitable angle in relation to the patient anatomy. This angle is shown by angle 790.

The intravascular device 720 may be any suitable intravascular device. In the example shown, the device 720 may include a pressure sensing guidewire. As the pressure-sensing guidewire moves through the patient vasculature, the x-ray imaging system may acquire multiple fluoroscopy images 710 showing a radiopaque portion of the pressure-sensing guidewire. In this way, each fluoroscopy image 710 shown in FIG. 7 may depict the pressure-sensing guidewire positioned at a different location such that the processor circuit 510 (FIG. 5) may track the position of the pressure-sensing guidewire throughout an intravascular coregistration procedure.

As the pressure-sensing guidewire is pulled through the patient vasculature, it may acquire pressure data 730. In an example, the pressure data 730 shown in FIG. 7 may be iFR measurements. However, the pressure data may be any suitable data, including FFR data, iFR data, or any other measurements or metrics relating to blood pressure, blood flow, or other physiological data acquired during a pullback of a guidewire.

As the physician pulls the pressure-sensing guidewire through the patient vasculature, each iFR data point 730 acquired by the pressure-sensing guidewire may be associated with a position within a fluoroscopy image 710, as indicated by the arrow 761. For example, the first pressure data measurement 730 shown in FIG. 7 may be associated with a location within the first fluoroscopy image 710. The first iFR measurement 730 may be a pressure ratio acquired by the pressure-sensing guidewire (in conjunction with the proximal pressure-sensing catheter) at a position within the vasculature, as depicted in the first fluoroscopy image 710 and as shown by the radiopaque portion of the pressure-sensing guidewire within the image 710. Similarly, an additional iFR measurement 730 may be associated with an additional fluoroscopy image 710 showing the pressure-sensing guidewire at a new location within the image 710, and so on. The processor circuit may determine the locations of the pressure-sensing guidewire within each acquired x-ray image 710. The processor circuit 510 may identify a location of a pressure-sensing guidewire by any suitable method. For example, the processor circuit 510 may perform various image processing techniques, such as edge identification of the radiopaque marker, pixel-by-pixel analysis to determine transition between light pixels and dark pixels, filtering, or any other suitable techniques to determine the location of the pressure-sensing guidewire. In some embodiments, the processor circuit may use various artificial intelligence methods including deep learning techniques such as neural networks or any other suitable techniques to identify the locations of the pressure-sensing guidewire within the x-ray images 710.

Any suitable number of iFR data points 730 may be acquired during a device pullback and any suitable number of fluoroscopy images 710 may be obtained. In some embodiments, there may be a one-to-one ratio of fluoroscopy images 710 and iFR data 730. In other embodiments, there may be differing numbers of fluoroscopy images 710 and iFR data 730. The process of co-registering the iFR data 730 and/or intravascular data 830 (described with reference to FIG. 8) with one or more x-ray images may include some features similar to those described in U.S. Pat. No. 7,930,014, titled, "VASCULAR IMAGE CO-REGISTRATION," and filed Jan. 11, 2006, which is hereby incorporated by reference in its entirety. The co-registration process may also include some features similar to those described in U.S. Pat. Nos. 8,290,228, 8,463,007, 8,670,603, 8,693,756, 8,781,193, 8,855,744, and 10,076,301, all of which are also hereby incorporated by reference in their entirety.

After a pullback procedure is complete, or during a pullback procedure, the system 100 may generate a fluoroscopy-based 2D pathway 740 defined by the positions of the pressure-sensing guidewire within the x-ray fluoroscopy images 710. The different positions of the pressure-sensing guidewire during pullback, as shown in the fluoroscopy images 710, may define a two-dimensional pathway 740, as shown by the arrow 760. The fluoroscopy-based 2D pathway 740 reflects the path of the pressure-sensing guidewire as it moved through the patient vasculature as observed from the angle 790 by the x-ray imaging device 152. The fluoroscopy-based 2D pathway 740 defines the path as measured by the x-ray device which acquired the fluoroscopy images 710, and therefore shows the path from the same angle 790 at which the fluoroscopy images were acquired. Stated differently, the 2D pathway 740 describes the projection of the 3D path followed by the device onto the imaging plane at the imaging angle 790. In some embodiments, the pathway 740 may be determined by an average of the detected locations of the pressure-sensing guidewire in the fluoroscopy images 710. For example, the pathway 740 may not coincide exactly with the guidewire in any fluoroscopy image 710 selected for presentation. In some embodiments, the pathway 740 may not be displayed to a user. For example, each pressure data 730 may be associated with a particular coordinate within the image 711. In this way, the pressure data 730 may be coregistered directly to the image 711. The group of all coordinates associated with the pressure data 730 may define a pathway 740. In this way, iFR data may be associated directly with a portion or location within the roadmap image 711.

As shown by the arrow 762, because the two-dimensional path 740 is generated based on the fluoroscopy images 710, each position along the two-dimensional path 740 may be associated with one or more fluoroscopy images 710. As an example, at a location 741 along the path 740, the first fluoroscopy image 710 may depict the pressure-sensing guidewire at that same position 741. In addition, because a correspondence was established between the fluoroscopy images 710 and the iFR data 730 as shown by the arrow 761, iFR data 730, such as the first iFR measurement shown, may also be associated with the location 741 along the path 740 as shown by the arrow 763.

Finally, the path 740 generated based on the locations of the pressure-sensing guidewire within the fluoroscopy images 710 may be overlaid onto any suitable fluoroscopy image 711 (e.g., one of the fluoroscopic images 710 in the fluoroscopic image stream). In this way, any location along the path 740 displayed on the fluoroscopy image 711 may be associated with iFR data such as an iFR measurement 730, as shown by the arrow 764. For example, the first pressure datum 730 shown in FIG. 7 may be acquired simultaneously with the first fluoroscopy image 710 shown and the two may be associated with each other as shown by the arrow 761. The fluoroscopy image 710 may then indicate the location of the pressure-sensing guidewire along the path 740, as shown by the arrow 762, thus associating the pressure datum 730 with the location 741 along the path 740 as shown by the arrow 763. Finally, the pressure datum 730 may be associated with the location within the fluoroscopy image 710 at which it was acquired by overlaying the path 740 with associated data on the fluoroscopy image 711. The pathway 740 itself may or may not be displayed on the image 711.

In some embodiments, the co-registered iFR data are associated with an x-ray image obtained with contrast (in which the vessel is visible) such that that the position at which the iFR data are obtained is known relative to locations along the vessel.

FIG. 8 is a diagrammatic view of a relationship between x-ray fluoroscopy images 810, intravascular ultrasound images 830, and a path 840 defined by the motion of an intravascular device, according to aspects of the present disclosure. FIG. 8 describes a method of coregistering intravascular data 830 including intravascular images with corresponding locations on one or more fluoroscopy images 810 of the same region of a patient's anatomy. Aspects of coregistering intravascular data 830, including IVUS images, may be similar to concepts described with reference to FIG. 7.

Specifically, the patient anatomy may be imaged with an x-ray device while a physician performs a pullback with an intravascular device 820, e.g., while the intravascular device 820 moves through a blood vessel of the anatomy. The intravascular device may be substantially similar to the intravascular device 102 described with reference to FIG. 1C. The x-ray device used to obtain the fluoroscopy images 810 may be substantially similar to the x-ray device 152 of FIG. 1B. In some embodiments, the fluoroscopy images 810 may be obtained while no contrast agent is present within the patient vasculature. Such an embodiment is shown by the fluoroscopy images 810 in FIG. 8. In other embodiments, a contrast agent is present within the patient vasculature. In that regard, the fluoroscopy images 810 may alternatively be angiogram images or any suitable type of extraluminal images. The radiopaque portion of the intravascular device 820 is visible within the fluoroscopy image 810. The fluoroscopy images 810 may correspond to a continuous image stream of fluoroscopy images and may be obtained as the patient anatomy is exposed to a reduced dose of x-radiation. It is noted that the fluoroscopy images 810 may be acquired with the x-ray source 160 and the x-ray detector 170 positioned at any suitable angle in relation to the patient anatomy. This angle is shown by angle 890.

The intravascular device 820 may be any suitable intravascular device. As the intravascular device 820 moves through the patient vasculature, the x-ray imaging system may acquire multiple fluoroscopy images 810 showing the radiopaque portion of the intravascular device 820. In this way, each fluoroscopy image 810 shown in FIG. 8 may depict the intravascular device 820 positioned at a different location such that a processor circuit may track the position of the intravascular device 820 over time.

As the intravascular device 820 is pulled through the patient vasculature, it may acquire intravascular data 830. In an example, the intravascular data 830 shown in FIG. 8 may be IVUS images. However, the intravascular data may be any suitable data, including IVUS images, OCT images, intravascular photoacoustic (IVPA) images, or any other measurements or metrics relating to lumen structure, or other physiological data acquired during a pullback of an intravascular device.

As the physician pulls the intravascular device 820 through the patient vasculature, each intravascular data point 830 acquired by the intravascular device 820 may be associated with a position within the patient anatomy in the fluoroscopy images 810, as indicated by the arrow 861. For example, the first IVUS image 830 shown in FIG. 8 may be associated with the first fluoroscopy image 810. The first IVUS image 830 may be an image acquired by the intravascular device 820 at a position within the vasculature, as depicted in the first fluoroscopy image 810 as shown by the intravascular device 820 within the image 810. Similarly, an additional IVUS image 830 may be associated with an additional fluoroscopy image 810 showing the intravascular device 820 at a new location within the image 810, and so on. The processor circuit may determine the locations of the intravascular device 820 within each acquired x-ray image 810 by any suitable method. For example, the processor circuit may perform various image processing techniques, such as edge identification of the radiopaque marker, pixel-by-pixel analysis to determine transition between light pixels and dark pixels, filtering, or any other suitable techniques to determine the location of the imaging device 820. In some embodiments, the processor circuit may use various artificial intelligence methods including deep learning techniques such as neural networks or any other suitable techniques to identify the locations of the imaging device 820 within the x-ray images 810.

Any suitable number of IVUS images or other intravascular data points 830 may be acquired during an intravascular device pullback and any suitable number of fluoroscopy images 810 may be obtained. In some embodiments, there may be a one-to-one ratio of fluoroscopy images 810 and intravascular data 830. In other embodiments, there may be differing numbers of fluoroscopy images 810 and/or intravascular data 830.

The system 100 may additionally generate a fluoroscopy-based 2D pathway 840 defined by the positions of the intravascular device 820 within the x-ray fluoroscopy images 810. The different positions of the intravascular device 820 during pullback, as shown in the fluoroscopy images 810, may define a two-dimensional pathway 840, as shown by the arrow 860. The fluoroscopy-based 2D pathway 840 reflects the path of one or more radiopaque portions of the intravascular device 820 as it moved through the patient vasculature as observed from the angle 890 by the x-ray imaging device 152. The fluoroscopy-based 2D pathway 840 defines the path as measured by the x-ray device which acquired the fluoroscopy images 810, and therefore shows the path from the same angle 890 at which the fluoroscopy images were acquired. Stated differently, the 2D pathway 840 describes the projection of the 3D path followed by the device onto the imaging plane at the imaging angle 890. In some embodiments, the pathway 840 may be determined by an average of the detected locations of the intravascular device 820 in the fluoroscopy images 810. For example, the pathway 840 may not coincide exactly with the guidewire in any fluoroscopy image 810 selected for presentation. It is noted, however, that the imaging catheter 102, as described with reference to FIG. 1-4, is positioned to move along the guidewire. In some embodiments, the pathway 840 may not be displayed to a user. For example, each IVSU image 830 may be associated with a particular coordinate within the image 811. In this way, the pressure data 830 may be coregistered directly to the image 811. The group of all coordinates associated with the pressure data 830 may define a pathway 840. In this way, IVUS images may be associated directly with a portion or location within the roadmap image 811.

As shown by the arrow 862, because the two-dimensional path 840 is generated based on the fluoroscopy images 810, each position along the two-dimensional path 840 may be associated with one or more fluoroscopy images 810. As an example, at a location 841 along the path 840, the first fluoroscopy image 810 may depict the intravascular device 820 at that same position 841. In addition, because a correspondence was also established between the fluoroscopy images 810 and the intravascular data 830 as shown by the arrow 861, intravascular data 830, such as the first IVUS image shown, may also be associated with the location 841 along the path 840 as shown by the arrow 863.

Finally, the path 840 generated based on the locations of the intravascular device 820 within the fluoroscopy images 810 may be overlaid onto any suitable fluoroscopy image 811 (e.g., one of the fluoroscopic images 810 in the fluoroscopic image stream). In this way, any location along the path 840 displayed on the fluoroscopy image 811 may be associated with IVUS data such as an IVUS image 830, as shown by the arrow 864. For example, IVUS image 830 shown in FIG. 8 may be acquired simultaneously with the fluoroscopy image 810 shown and the two may be associated with each other as shown by the arrow 861. The fluoroscopy image 810 may then indicate the location of the intravascular device 820 along the path 840, as shown by the arrow 862, thus associating the IVUS image 830 with the location 841 along the path 840 as shown by the arrow 863. Finally, the IVUS image 830 may be associated with the location within the fluoroscopy image 810 at which it was acquired by overlaying the path 840 with associated data on the fluoroscopy image 811. The pathway 840 itself may or may not be displayed on the image 811.

In the illustrated embodiment of FIG. 8, the co-registered IVUS images are associated with one of the fluoroscopic images obtained without contrast such that that the position at which the IVUS images are obtained is known relative to locations along the guidewire. In other embodiments, the co-registered IVUS images are associated with an x-ray image obtained with contrast (in which the vessel is visible) such that that the position at which the IVUS images are obtained is known relative to locations along the vessel.

Figure 9:
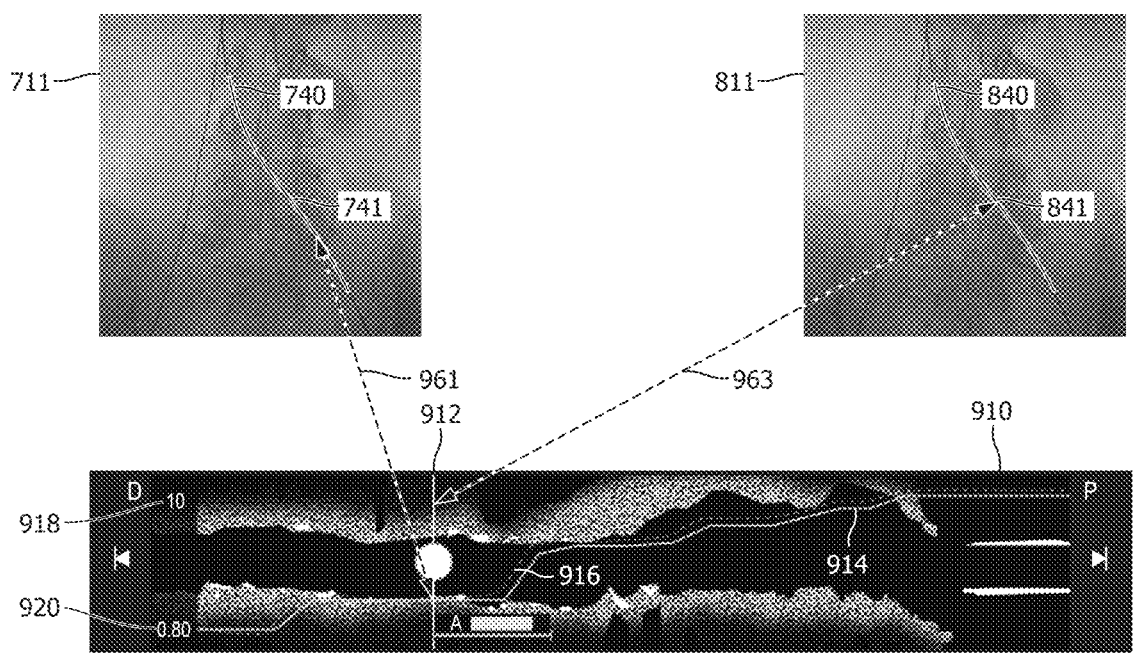
FIG. 9 is a diagrammatic view of a relationship between intravascular images coregistered to an extraluminal image, pressure data coregistered to an extraluminal image, and a longitudinal view based on the intravascular images and pressure data, according to aspects of the present disclosure.

FIG. 9 is a diagrammatic view of a relationship between intravascular images coregistered to an extraluminal image, pressure data coregistered to an extraluminal image, and a longitudinal view based on the intravascular images and pressure data, according to aspects of the present disclosure. In particular, FIG. 9 may illustrate a relationship between the roadmap x-ray fluoroscopy image 711 and coregistered iFR data 730 (FIG. 7) and the roadmap x-ray fluoroscopy image 811 and coregistered IVUS imaging data 830 (FIG. 8). In this way, FIG. 9 describes a method of coregistering iFR data 730 with IVUS images 830 of the same region of a patient's anatomy.

In some aspects, physiology data may be superimposed on an IVUS longitudinal cross-sectional image (e.g., an ILD). Co-registering of the physiology and IVUS data advantageously allows the user to better understand the physiology data associated with a specific IVUS frame as well as in context of the entire imaged and/or measured section of the vessel. Co-registration is a differentiator in the diagnosis and treatment of coronary arterial disease (CAD). Co-registration of imaging and physiology data to an angiogram and/or to each other allows the physician to more easily understand the coronary anatomy of the patient as well as determine optimal treatment pathways.

The pathway 740 described with reference to FIG. 7 may include location data and iFR data. For example, the pathway 740 may associate iFR data (e.g., data 730 of FIG. 7) with locations along the vessel (e.g., vessel 690 of FIG. 6). For example, each iFR datum 730 may correspond to one position coordinate that, together with the other iFR data position coordinates, defines the pathway 740. The position coordinate of the first received iFR datum may correspond to a starting location of the pressure guidewire and may be the starting location of the pathway 740. The last received iFR datum may correspond to an ending location. A length along the vessel and/or guidewire between the starting location and ending location may define a length of the pathway 740. In one embodiment, each iFR datum is associated with a two-dimensional coordinate specifying a location within the roadmap image 711. In another embodiment, each iFR datum is associated with a one-dimensional coordinate of a distance measurement from the starting location.

In this embodiment, the starting location may correspond to an origin, or a distance of zero.

The pathway 840 described with reference to FIG. 8 may include similar location data, as well as IVUS imaging data. For example, the pathway 840 may associate IVUS image data (e.g., IVUS data 830 of FIG. 8) with locations along the vessel (e.g., vessel 690 of FIG. 6). For example, each IVUS image 830 may correspond to one position coordinate that, together with the other IVUS image position coordinates, defines the pathway 840. As with the pathway 740, the position coordinate of the first received IVUS image may correspond to a starting location of the imaging device and may be the starting location of the pathway 840. The last received IVUS image may correspond to an ending location. A length along the vessel and/or guidewire between the starting location and ending location may define a length of the pathway 840. In one embodiment, each IVUS image is associated with a two-dimensional coordinate specifying a location within the roadmap image 811. In another embodiment, each IVUS image is associated with a one-dimensional coordinate of a distance measurement from the starting location. In this embodiment, the starting location may correspond to an origin, or a distance of zero.

In an embodiment in which each of the iFR data and the IVUS images are associated with a two-dimensional coordinate identifying a location within the roadmap image 711 or the roadmap image 811 respectively, iFR data and IVUS images obtained at the same location along the vessel may be coregistered based on having the same or substantially similar two-dimensional coordinates. In this embodiment, the roadmap image 711 and the roadmap image 811 may be the same image or substantially the same image.

In an embodiment in which each of the iFR data and IVUS images are associated with a one-dimensional length identifying a distance from a respective starting location, a distance between the starting location of the iFR pathway 740 and the starting location of the IVUS imaging pathway 840 may be determined. This distance may be used as an offset to match the one-dimensional distance coordinates of iFR data to the same locations as the IVUS images. In this embodiment, the roadmap image 711 and the roadmap image 811 may be the same image or may differ.

Due to the relationship between the pathway 740 and accompanying iFR data to locations along the patient vessel and the relationship between the pathway 840 and accompanying IVUS image data to locations along the same vessel, iFR data and IVUS imaging data may be displayed in conjunction at the same locations along the vessel, as shown by the longitudinal view 910 of the body lumen and overlaid data shown in FIG. 9. The longitudinal view can be referenced as an image longitudinal display (ILD) or in-line digital (ILD) view.

The IVUS images acquired may be used to create the ILD 910. In that regard, an IVUS image is a tomographic or radial cross-sectional view of the blood vessel. The ILD 910 provides a longitudinal cross-sectional view of the blood vessel. The ILD 910 can be a stack of the IVUS images acquired at various positions along the vessel, such that the longitudinal view of the ILD 910 is perpendicular to the radial cross-sectional view of the IVUS images. In such an embodiment, the ILD 910 may show the length of the vessel, whereas an individual IVUS image is a single radial cross-sectional image at a given location along the length. In another embodiment, the ILD 910 may be a stack of the IVUS images acquired overtime during the imaging procedure and the length of the ILD 910 may represent time or duration of the imaging procedure. The ILD 910 may be generated and displayed in real time or near real time during the pullback procedure. As each additional IVUS image is acquired, it may be added to the ILD 910. For example, at a point in time during the pullback procedure, the ILD 910 shown in FIG. 9 may be partially complete. In some embodiments, the processor circuit may generate an illustration of a longitudinal view of the vessel being imaged based on the received IVUS images. For example, rather than displaying actual vessel image data as the ILD 910 does, the illustration may be a stylized version of the vessel, with e.g., continuous lines showing the lumen border and vessel border.

As an example, an indicator 912 may identify a location along the vessel as shown in the ILD 910. This indicator 912 may simultaneously correspond to the location 741 along the pathway 740 and the same location 841 along the pathway 840. As a result, the IVUS image obtained at the location 841 may be displayed at the location of the indicator 912 as part of the ILD 910 as shown by the arrow 961. Similarly, the iFR value associated with the location 741 may be overlaid over the ILD 910 at the same location of the indicator 912 as shown by the arrow 963.

All the obtained iFR values associated with the pathway 740 may be overlaid over the ILD 910. One example, of how iFR values may be displayed to a user is shown by the line 914. As shown by the indicators 918 and 920, a plot may be overlaid over the ILD 910. For example, a minimum iFR value may correspond to the indicator 920 and a maximum value may correspond to the indicator 918. The vertical position of the line 914 on the ILD 910 may correspond to the iFR value being some value between the minimum and maximum. For example, at a distal most position along the ILD 910, the pressure data may be at a minimum, as shown by the line 914 being positioned close to the bottom of the ILD 910 and aligned with, or at the same vertical positions as, the minimum value 920. Similarly, at a proximal end, the pressure data may be at a maximum. This is shown by the line 914 being at the top of the ILD 910 aligned with, or at the same vertical position as, the maximum value 918. In some embodiments, a user may select a portion of the line 914 and/or the line 916 (described hereafter) and the system 100 may display to the user the iFR value associated with the selected location. The system 100 may also display the iFR value of the position of the indicator 912.

The system 100 may perform any suitable processing of the iFR data or IVUS imaging data. For example, the processor circuit 510 of the system may perform averaging, smoothing, segmentation, grouping, or any other suitable data processing before or after the data is displayed to a user. In one example, the line 914 shown in FIG. 9 may represent processed iFR data. The circuit 510 may also be configured to simultaneously display raw iFR data. The raw iFR data may be shown by the line. Visual representations of the raw iFR data and the processed iFR data may be visually differentiated in any way, such as with differing colors, patterns, transparency, or any other forms of emphasis or differentiation. The processor circuit 510 may show the lines 914 and 916 simultaneously or separately.

The processor circuit 510 may be configured to perform length measurements of any devices or any anatomical structures or features within an extraluminal image. Length determinations may include, for example, a length of the pullback path (e.g., a pullback path of a intravascular imaging device and/or a pressure sensing device), lengths of recommended stents, lengths between points of interest, or any other lengths. Length determination may be made by the processor circuit 510 automatically or in response to a user input. Length determinations may be made based, at least in part, on a radiopaque section of the pressure-sensing wire. For example, a radiopaque section of the guidewire may be of a known length (e.g., 3 cm). The system may use this length as a reference length to determine the length of any other features within the image. A similar method may be applied using radiopaque portions of IVUS imaging devices. For example, in some embodiments, the transducer section of an intravascular imaging device may be constructed of a radiopaque material and may be of known dimensions. Additional markers may also be present of known length along a comparison of lengths to be made by the processor circuit 510.

In some embodiments, errors in location data of the IVUS pullback may be present. Additionally, errors in location data along the physiology pullback may be present. Because IVUS location data and physiology data are co-registered to an extraluminal image to be coregistered to each other, the errors of both the IVUS pullback location information as well as the physiology pullback information may stack. To relate these stacking errors, the system may generate and display error bars associated with either the iFR data (dots 1114 or lines 914 and 916) or the IVUS data. These error bars may be displayed along the ILD or an extraluminal image and may assist the user in easily understanding the presence and amount of error associated with displayed location data.

Figure 10:
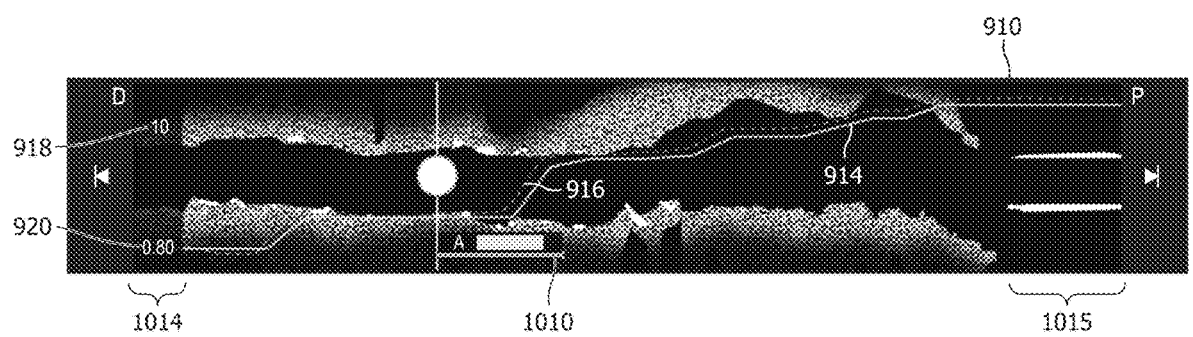
FIG. 10 is a diagrammatic view of an image-based longitudinal view of a lumen with coregistered pressure data, according to aspects of the present disclosure.

FIG. 10 is a diagrammatic view of an image-based longitudinal view of a lumen with coregistered pressure data, according to aspects of the present disclosure. FIG. 10 shows a depiction a stent 1010 along the ILD. In that regard the stent 1010 can be overlaid on the ILD 910. A stent placement recommendation may be made automatically by the processor circuit 510. This recommendation may include the type of stent, length of stent, diameter of the stent, proximal and distal landing zones for a stent, as well as the number of stents recommended, or any other suitable stent parameters. In some embodiments, the recommendation of a stent may be based on any of the iFR data, IVUS imaging data, the locations of side branches of the imaged/measured vessels, distance between consecutive stents or stents in series, or any other factors. Aspects of automatic recommendation for stent may include features described in U.S. Provisional Application No. 63/288,554, filed Dec. 11, 2021, and titled "AUTOMATIC SEGMENTATION AND TREATMENT PLANNING FOR A VESSEL WITH COREGISTRATION OF PHYSIOLOGY DATA AND EXTRALUMINAL DATA", which is hereby incorporated by reference in its entirety. In some embodiments, the depiction of the stent 1010 may represent a virtual stent or a planned stent. In some embodiments, the depiction of the virtual stent 1010 can be manually positioned by a user input by a user input device (e.g., touch screen display, mouse/keyboard, etc.). For example, the processor circuit 510 may be configured to receive a user input providing instructions to adjust the location, length, etc. of the stent. The user may determine the stent placement, or other features of the stent, based on the iFR data depicted by line 914 and/or IVUS imaging data. In other embodiments, the graphical element 1010 shown overlaid over the ILD 910 may not be a stent, but may be any other suitable treatment. For example, the graphical element 1010 may be representative of an angioplasty device, balloon, atherectomy device, or any other treatment device.

In some implementations, the line 914 may alternatively be referred to as a trendline. In some implementations, the line 914 may be based on physiology data measured by a physiology measurement device. In one example, the line 914 may be based on pressure measurements within a blood vessel. In some implementations, the line 914 may illustrate iFR values. In some implementations, the iFR values corresponding to the line 914 may be based on pressure measurements acquired by a pressure guidewire at a distal location and pressure measurements simultaneously acquired by a pressure sensor at a proximal location, such as one positioned on a guide catheter. In some implementations, a pressure device measuring iFR values may be positioned within a renal artery with a pressure sensor positioned on a pressure guidewire receiving measurements within the renal artery and a pressure sensor positioned on a guide catheter positioned within the aorta measurement pressure within the aorta. In some implementations, proximal pressure measurements or distal pressure measurements may be made by an aortic catheter. The values of the line 914 may, therefore, correspond to a pressure ratio between any two of these pressure sensors.

FIG. 10 also shows a region 1014. As shown in FIG. 10, the line 914 corresponding to iFR data terminates at a location proximal of the region 1014. This may be because the region 1014 was a region which was imaged with an IVUS imaging device but not measured with the pressure-sensing guidewire. As a result, the region 1014 may show an imaged based section of the ILD but may not include overlaid iFR data. In the example shown in FIG. 10, the region 1014, therefore, may correspond to the region 614 shown and described with reference to FIG. 6.

The region 1015 in FIG. 10 is also shown. The image data included as part of the ILD 910 is shown to terminate at a location distal of the region 1015. This may be because the region 1015 was a region which was measured with a pressure-sensing guidewire but not imaged with the IVUS device. As a result, the region 1015 may show iFR data of the lines 914 and/or 916 but not image-based data corresponding to data acquired with the IVUS imaging device. In the example shown in FIG. 10, the region 1015, therefore, may correspond to the region 615 shown and described with reference to FIG. 6.

As shown by the regions 1014 and/or 1015, one or more offsets may be caused by regions of the vessel being measured by the intravascular device or the pressure pullback device alone. As a result, the system may perform various calibration procedures to ensure that locations of intravascular image data matches with location of corresponding pressure data. For example, the system may perform calibration to ensure the pressure data is coregistered to the same place as the corresponding IVUS data. In cases, the physiological pullback length (e.g., the path 603) is longer than IVUS pullback length (e.g., the path 605) as shown in the top right of the ILD 910 (e.g., the region 1015). Because the path of the physiology pullback and the IVUS pullback both start from some reference point which can be offset or calibrated, the locations along the physiology pullback may match the locations along the IVUS pullback. As an example, intraluminal images (e.g., IVUS images) may, by any of the co-registration steps previously described, be correlated with first corresponding positions along a body lumen of a patient. Intraluminal physiology measurements (e.g., iFR measurements) may similarly be correlated with second corresponding positions along the same body lumen of the patient. In this example, one, some, or all of the first positions of the intraluminal images could be the same or difference as any one, some, or all of the second positions of the intraluminal physiology measurements. In some implementations, the intraluminal images and the physiology measurements may correspond to the same locations along the body lumen.

Figure 11:
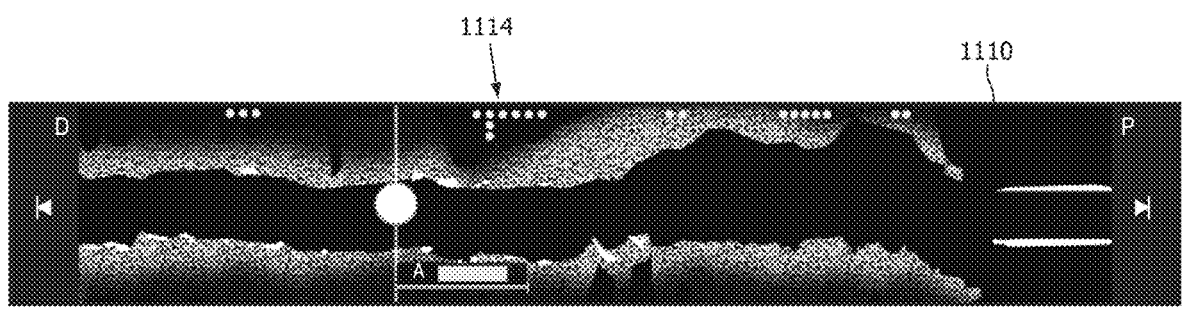
FIG. 11 is a diagrammatic view of an image-based longitudinal view of a lumen with coregistered pressure data, according to aspects of the present disclosure.

FIG. 11 is a diagrammatic view of an image-based longitudinal view 1110 of a lumen with coregistered pressure data, according to aspects of the present disclosure. FIG. 11 may show an additional method of displaying overlaid iFR data over an ILD (e.g., the ILD 1110). As shown in FIG. 11, multiple dots 1114 may be overlaid over the ILD 1110. The ILD 1110 may be substantially similar to the ILD 910 shown previously.

In the embodiment shown in FIG. 11, each dot 1114 may correspond to a change in the pressure ratio (e.g., iFR). For example, in some embodiments, the presence of one dot 1114 at a given location may correspond to a change in pressure ratio of 0.01. A dot 1114 may be associated with any suitable change in pressure ratio besides 0.01. This value may be determined by the processor 510 or the user of the system 100. The dots 1114 shown overlaid over the ILD 1110 may be positioned at any suitable location, including overlaid over the ILD 1110, proximate to the ILD 1110, or at any other location.

It is additionally noted that the dots 1114 may be of any suitable appearance. In particular, the dots 1114 are shown and described as round dots in the present disclosure for pedagogical purposes only. For example, the dots 1114 may be of any suitable shape, pattern, size, or any other visual appearance.

Figure 12:
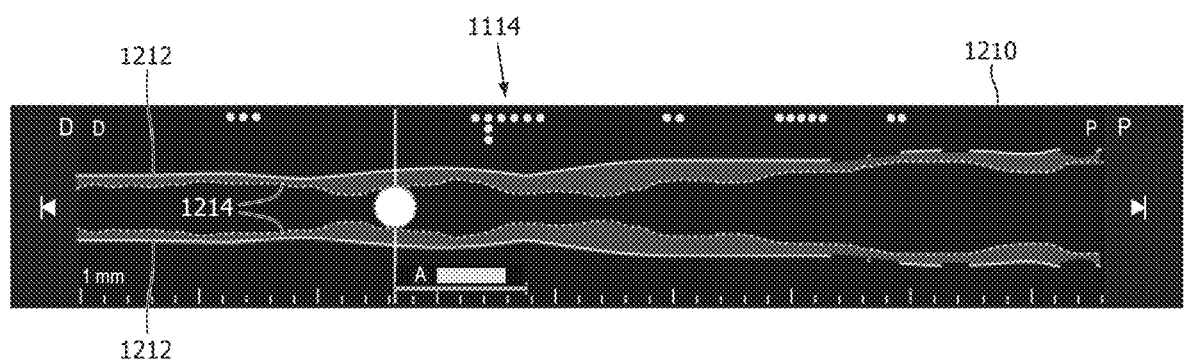
FIG. 12 is a diagrammatic view of a measurement-based longitudinal view of a lumen with coregistered pressure data, according to aspects of the present disclosure.

FIG. 12 is a diagrammatic view of a measurement-based longitudinal view 1210 of a lumen with coregistered pressure data, according to aspects of the present disclosure. FIG. 12 may show an additional method of displaying overlaid iFR data over an ILD (e.g., the ILD 1210). As shown in FIG. 12, multiple dots 1114 may be overlaid over an ILD 1210.

In some embodiments, the ILD 1210 may include a stylized ILD. In particular, a stylized ILD may be an ILD generated based on lumen measurements, as opposed to generated based on IVUS images. As an example and referring to FIG. 11, while the ILD 1110 may be based primarily on IVUS images, the stylized ILD 1210 may be based on intraluminal measurements of the imaged vessel and/or lumen. For example, the stylized ILD 1210 includes lines 1212 and 1214. Lines 1212 may correspond to the vessel wall of the imaged vessel. For example, the processor circuit 510 may automatically identify the vessel wall in each of the received IVUS images during an imaging procedure. The processor circuit 510 may determine a distance from the imaging catheter to the vessel wall in each direction around the catheter in each of the IVUS images. Based on these measurements (e.g., the identification of the vessel wall and the distance from the wall to the catheter), the processor circuit may determine an average diameter of the vessel for each IVUS image at each location along the vessel. These averaged diameters may be associated with respective IVUS images and associated with respective locations along the pathway 840 (FIG. 8). The lines 1212 may then be generated as symmetrical lines about a center line along the ILD 1210 and spaced apart from one another based on the average diameter of the vessel wall at that location. This enables a user of the system 100 to easily see the vessel wall along the imaged section of the vessel by presenting a clearly identified and simplified depiction of the vessel wall. In some embodiments, the ILD 1210 may be referred to as a vessel reconstruction.

Similarly, a stylized depiction of the lumen may be identified and shown by lines 1214. Lines 1214 may correspond to the lumen boundary of the imaged vessel. For example, the processor circuit 510 may automatically identify the lumen boundary in each of the received IVUS images during an imaging procedure. The processor circuit 510 may additionally determine a distance from the imaging catheter to the lumen boundary in each direction around the catheter in each of the IVUS images. Based on these measurements (e.g., the identification of the lumen boundary and the distance from the lumen boundary to the catheter), the processor circuit may determine an average diameter of the lumen boundary for each IVUS image. These averaged diameters may be associated with respective IVUS images and associated with respective locations along the pathway 840 (FIG. 8). The lines 1214 may then be generated as symmetrical about a center line along the ILD 1210 and spaced apart from one another based on the average diameter of the lumen boundary at that location. This enables a user of the system 100 to easily see the lumen boundary along the imaged section of the vessel by presenting a clearly identified and simplified depiction of the boundary.

Examples of border detection, image processing, image analysis, and/or pattern recognition include U.S. Pat. No. 6,200,268 entitled "VASCULAR PLAQUE CHARACTERIZATION" issued Mar. 13, 2001 with D. Geoffrey Vince, Barry D. Kuban and Anuja Nair as inventors, U.S. Pat. No. 6,381,350 entitled "INTRAVASCULAR ULTRASONIC ANALYSIS USING ACTIVE CONTOUR METHOD AND SYSTEM" issued Apr. 30, 2002 with Jon D. Klingensmith, D. Geoffrey Vince and Raj Shekhar as inventors, U.S. Pat. No. 7,074,188 entitled "SYSTEM AND METHOD OF CHARACTERIZING VASCULAR TISSUE" issued Jul. 11, 2006 with Anuja Nair, D. Geoffrey Vince, Jon D. Klingensmith and Barry D. Kuban as inventors, U.S. Pat. No. 7,175,597 entitled "NON-INVASIVE TISSUE CHARACTERIZATION SYSTEM AND METHOD" issued Feb. 13, 2007 with D. Geoffrey Vince, Anuja Nair and Jon D. Klingensmith as inventors, U.S. Pat. No. 7,215,802 entitled "SYSTEM AND METHOD FOR VASCULAR BORDER DETECTION" issued May 8, 2007 with Jon D. Klingensmith, Anuja Nair, Barry D. Kuban and D. Geoffrey Vince as inventors, U.S. Pat. No. 7,359,554 entitled "SYSTEM AND METHOD FOR IDENTIFYING A VASCULAR BORDER" issued Apr. 15, 2008 with Jon D. Klingensmith, D. Geoffrey Vince, Anuja Nair and Barry D. Kuban as inventors and U.S. Pat. No. 7,463,759 entitled "SYSTEM AND METHOD FOR VASCULAR BORDER DETECTION" issued Dec. 9, 2008 with Jon D. Klingensmith, Anuja Nair, Barry D. Kuban and D. Geoffrey Vince, as inventors, the teachings of which are hereby incorporated by reference herein in their entirety.

The lines 1212 and 1214 may be displayed to a user simultaneously, as shown in FIG. 12, or separately. When shown simultaneously, the user may be able to easily identify the diameter of the vessel wall in comparison to the diameter of the lumen boundary at every location along the imaged vessel and easily and quickly assess the extent of constrictions within the imaged vessel. The lines 1212 and 1214 may be differentiated from one another using any of the methods described herein.

The dots 1114 may additionally be overlayed over the stylized ILD 1210 as shown in FIG. 12. The dots 1114 may be the same as those described with reference to FIG. 11. The combination of a stylized depiction of the vessel wall (e.g., lines 1212), a stylized depiction of the lumen boundary (e.g., lines 1214) and the dots 1114 representing a change in pressure ratios along the vessel provide a user of the system 100 with accurate and succinct views of the level of constriction within a vessel. Using this data, the user may be able to quickly and accurately identify locations of the vessel in need of treatment and identify what kinds of treatment are needed.

As shown in FIG. 12, the depiction of the vessel wall by lines 1212 may include breaks in the lines 1212. These breaks may correspond to vessel side branches. The locations of these side branches may be automatically determined by the processor circuit 510 or may be identified by a user of the system on either an extraluminal image, IVUS images, or the ILD shown.

It is additionally noted that pressure data may be displayed in conjunction with the ILD 1210 in any way. As an example, lines similar to the lines 914 and/or 916 may be overlaid over the measurement-based ILD 1210. In this way, the plot style of displaying pressure ratio data shown and described with reference to FIGS. 9 and 10, including the lines 914 and 916 as well as indicators 918 and 920, may also be overlaid over the stylized ILD shown in FIG. 12. For example, the stylized ILD 1210 may include the dots 1114 and/or the lines 914 and 916 and accompanying indicators 918 and 920. Any of the ILDs described herein may also include any of the forms of pressure change data described or shown herein.

Figure 13:
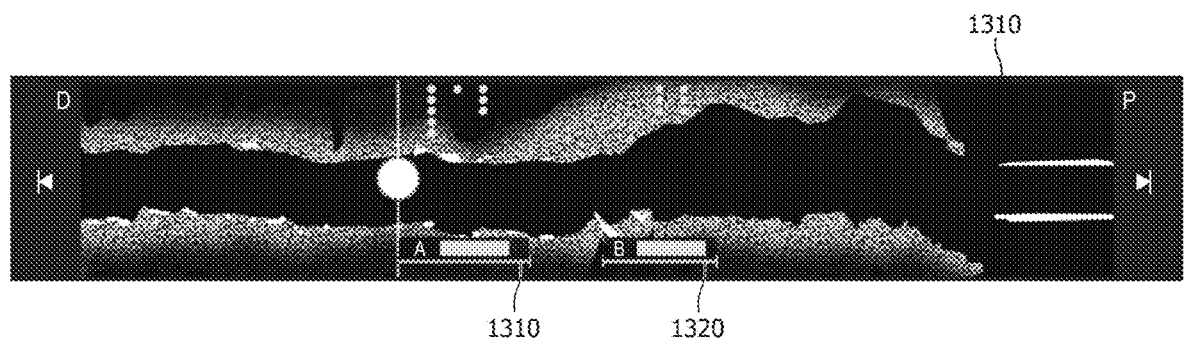
FIG. 13 is a diagrammatic view of an image-based longitudinal view of a lumen with coregistered pressure data, according to aspects of the present disclosure.

FIG. 13 is a diagrammatic view of an image-based longitudinal view 1310 of a lumen with coregistered pressure data, according to aspects of the present disclosure. FIG. 13 shows an additional ILD 1310. The ILD 1310 may depict multiple stents. For example, as shown in FIG. 13, a stent 1315 is shown overlaid over the ILD 1310 and an additional stent 1320 may be shown overlaid over the ILD 1310. In some embodiments, the stent 1315 and the stent 1320 may be virtual stents. For example, the stents 1315 and 1320 shown along the 1310 may be recommended locations of stents to be deployed within the vessel.

In some embodiments, the stent 1315 may correspond to a virtual stent automatically recommended by the processor circuit 510 according to the principles outlined with reference to FIG. 10. The stent 1320 may correspond to a virtual stent manually placed by the user of the system. The system 100 may, for example, provide the user with a graphical user interface allowing the using to select a stent of any type or size and place it at any location along the ILD 1310. In this way, the user may use the ILD 1310 (or any other ILDs described herein) to plan stent deployment.

In some embodiments, after a virtual stent (e.g., the stents 1010, 1315, or 1320) are recommended, chosen, designated, or shown, the system may predict a virtual change in pressure data. For example, the system may generate modified versions of the lines 914 and 916 (FIG. 9) and/or dots 1114 (FIG. 11) showing the predicted change in pressure data. Aspects of predicting changes in pressure data of virtual stents may include various features including those described in U.S. Provisional Application No. 63/288,554, filed Dec. 11, 2021, and titled "AUTOMATIC SEGMENTATION AND TREATMENT PLANNING FOR A VESSEL WITH COREGISTRATION OF PHYSIOLOGY DATA AND EXTRALUMINAL DATA", which was incorporated previously. In some embodiments, the predicted modified pressure data may be displayed simultaneously with the pressure data pre-treatment (e.g., the lines 914 and 916 or dots 1114). In some embodiments, the predicted modified pressure data may be displayed separately from the pre-treatment data.

Figure 14:
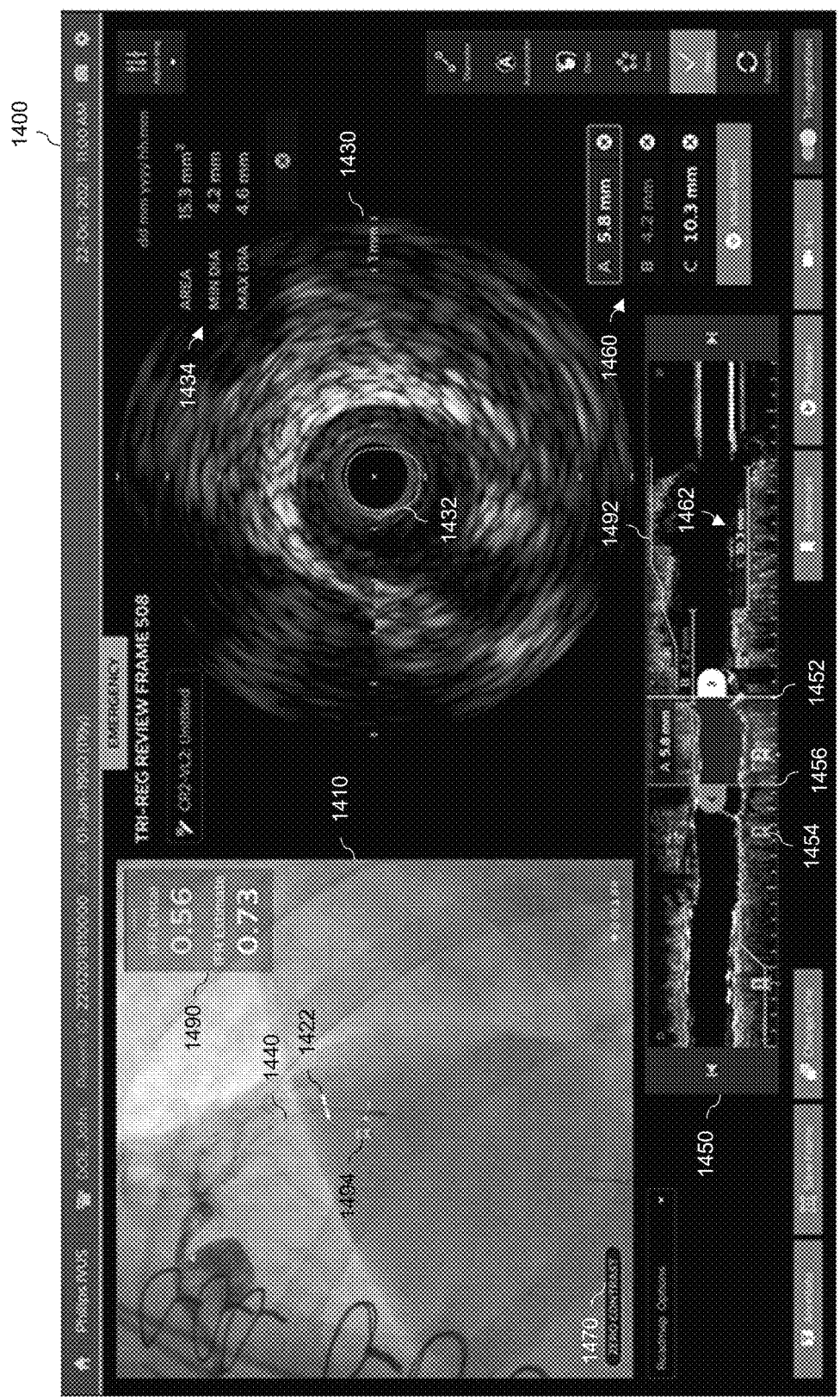
FIG. 14 is a diagrammatic view of a graphical user interface, according to aspects of the present disclosure.

FIG. 14 is a diagrammatic view of a graphical user interface 1400, according to aspects of the present disclosure. The graphical user interface 1400 may be displayed for a user after an IVUS pullback and an intraluminal physiology measurement pullback have been performed and IVUS images and physiology measurements have been coregistered to positions along the longitudinal view (e.g., an ILD 1450) and/or an extraluminal image (e.g., an x-ray image 1410).

The processor circuit 510 may be configured to coregister any intraluminal data (including IVUS images or iFR pressure ratio data) to a pathway (e.g., the pathway 740 and/or the pathway 840). For example, IVUS imaging data and/or physiology data, may be associated with locations along a pathway. When that pathway is overlaid over an extraluminal image, that intraluminal data may be displayed corresponding to locations within the extraluminal image illustrating where along a vessel, as shown by the pathway, that intraluminal data was acquired. As previously described, intraluminal physiology data may also be overlaid over a longitudinal view of a body lumen. As shown in FIG. 14, both an extraluminal image with coregistered intraluminal data and a longitudinal view with coregistered physiology data may be displayed within the same screen display.

As an example, the graphical user interface 1400 provides an x-ray image 1410, an IVUS image 1430, physiology data 1490, and a longitudinal view 1450 of the imaged vessel. The x-ray image 1410 may include a depiction of a pathway 1440. The pathway 1440 may be similar to the pathway 740 of FIG. 7 and/or the pathway 840 of FIG. 8. In some embodiments, the pathway 1440 may be a pathway corresponding to the movement of an intravascular imaging catheter. The pathway 1440 may be overlaid over the image 1410 and may identify the location of the imaged blood vessel. Various indicators related to coregistered intraluminal data may be displayed along or next to this pathway 1440, as shown in FIG. 14 and as will be described in more detail with reference to FIG. 15.

As an example, iFR data 1490 may be coregistered to the pathway 1440. For example, iFR data may be received by the processor circuit 510 during an iFR pullback while also receiving extraluminal images (e.g., the image 710 of FIG. 7). As iFR data are acquired and associated with locations within the extraluminal images, the iFR data may be identified at locations along the pathway 1440. As an example, an indicator 1422 may be provided along the pathway 1440. The indicator 1422 may correspond to the location along the pathway 1440 at which iFR data 1490, such as the iFR estimate metric, was acquired. Similarly, an indicator 1494 may be provided within the image 1410 along the pathway 1440. The indicator 1494 may identify the distal location that iFR data 1490 was acquired, such as the iFR distal value shown as part of data 1490.

Also shown within the graphical user interface 1400 is the IVUS image 1430. In that regard, a plurality of IVUS images (including the image 1430) can be co-registered to the pathway 1440. The IVUS image 1430 may be an IVUS image obtained at the location identified by the indicator 1422. The IVUS image 1430 may alternatively be an IVUS image obtained at the location identified by the indicator 1494. In some embodiments, the IVUS image 1430 may include a border 1432. This border may be identified automatically by the processor circuit 510 or may be identified by a user of the system. In some embodiments, the border 1432 may be a lumen border, a vessel border, a stent border, or any other border within the image.

Examples of border detection, image processing, image analysis, and/or pattern recognition include U.S. Pat. No. 6,200,268 entitled "VASCULAR PLAQUE CHARACTERIZATION" issued Mar. 13, 2001 with D. Geoffrey Vince, Barry D. Kuban and Anuja Nair as inventors, U.S. Pat. No.

6,381,350 entitled "INTRAVASCULAR ULTRASONIC ANALYSIS USING ACTIVE CONTOUR METHOD AND SYSTEM" issued Apr. 30, 2002 with Jon D. Klingensmith, D. Geoffrey Vince and Raj Shekhar as inventors, U.S. Pat. No. 7,074,188 entitled "SYSTEM AND METHOD OF CHARACTERIZING VASCULAR TISSUE" issued Jul. 11, 2006 with Anuja Nair, D. Geoffrey Vince, Jon D. Klingensmith and Barry D. Kuban as inventors, U.S. Pat. No. 7,175,597 entitled "NON-INVASIVE TISSUE CHARACTERIZATION SYSTEM AND METHOD" issued Feb. 13, 2007 with D. Geoffrey Vince, Anuja Nair and Jon D. Klingensmith as inventors, U.S. Pat. No. 7,215,802 entitled "SYSTEM AND METHOD FOR VASCULAR BORDER DETECTION" issued May 8, 2007 with Jon D. Klingensmith, Anuja Nair, Barry D. Kuban and D. Geoffrey Vince as inventors, U.S. Pat. No. 7,359,554 entitled "SYSTEM AND METHOD FOR IDENTIFYING A VASCULAR BORDER" issued Apr. 15, 2008 with Jon D. Klingensmith, D. Geoffrey Vince, Anuja Nair and Barry D. Kuban as inventors and U.S. Pat. No. 7,463,759 entitled "SYSTEM AND METHOD FOR VASCULAR BORDER DETECTION" issued Dec. 9, 2008 with Jon D. Klingensmith, Anuja Nair, Barry D. Kuban and D. Geoffrey Vince, as inventors, the teachings of which are hereby incorporated by reference herein in their entirety.

Additionally depicted in the interface 1400 are metrics 1434. The metrics 1434 may relate to the IVUS image 1430 shown and specifically the border 1432. For example, the processor circuit 510 may automatically calculate various metrics 1434 related to the border 1432. For example, the processor circuit 510 may identify a cross-sectional area of the border 1432. The circuit may also identify a minimum diameter of the border, a maximum diameter of the border, or any other measurements or metrics related to the border 1432, or other aspects of the image 1430.

In some embodiments, the longitudinal view 140 may also be displayed. The longitudinal image 1450 may be referred to as in-line digital (ILD) display or intravascular longitudinal display (ILD) 1450. The IVUS images acquired during an intravascular ultrasound imaging procedure, such as during an IVUS pullback, may be used to create the ILD 1450. In that regard, an IVUS image is a tomographic or radial cross-sectional view of the blood vessel. The ILD 1450 provides a longitudinal cross-sectional view of the blood vessel. The ILD 1450 can be a stack of the IVUS images acquired at various positions along the vessel, such that the longitudinal view of the ILD 1450 is perpendicular to the radial cross-sectional view of the IVUS images. In such an embodiment, the ILD 1450 may show the length of the vessel, whereas an individual IVUS image is a single radial cross-sectional image at a given location along the length. In another embodiment, the ILD 1450 may be a stack of the IVUS images acquired overtime during the imaging procedure and the length of the ILD 1450 may represent time or duration of the imaging procedure. The ILD 1450 may be generated and displayed in real time or near real time during the pullback procedure. As each additional IVUS image is acquired, it may be added to the ILD 1450. For example, at a point in time during the pullback procedure, the ILD 1450 shown in FIG. 9 may be partially complete. In some embodiments, the processor circuit may generate an illustration of a longitudinal view of the vessel being imaged based on the received IVUS images. For example, rather than displaying actual vessel image data, the illustration may be a stylized version of the vessel, with e.g., continuous lines showing the lumen border and vessel border. As shown in FIG. 11, the ILD 1450 may represent a stylized ILD shown the lumen border 1156 extending as continuous lines across the ILD 1450. The location of the lumen borders 1156 may be positioned symmetrically around a center axis and may be positioned according to the luminal diameter calculated in each corresponding IVUS image.

The ILD 1450 may include a depiction of iFR data 1492, various length measurements 1462, indicators 1452 and 1456 identifying the beginning and ending of a length measurement, and bookmark identifiers 1454.

In some embodiments, the iFR data 1492 may be the same iFR data used to populate the metrics 1490 described. As shown in the ILD 1450 and because the ILD 1450 is generated based on IVUS data, if two intraluminal procedures (e.g., IVUS data and physiology data) are performed and coregistered to the same pathway (e.g., the pathway 1440), the same IVUS data and physiology data may be coregistered to each other, as shown by the iFR data 1492 shown at locations along the ILD 1450. The iFR data 1492 may be similar to the line 914 described with reference to FIG. 10. The ILD 1450 may additionally include iFR data 1493. In some implementations, the iFR data 1493 may correspond to raw iFR data and the iFR data 1492 may correspond to processed iFR data. The iFR data 1493 may be similar to the line 916 described with reference to FIG. 10.

The ILD 1450 may include additional or alternative physiology measurement data than the iFR data 1492 and 1493. For example, physiology data overlaid over the ILD 1450 may include dots, similar to the dots 1114 shown and described with reference to FIG. 11 and FIG. 12. In addition, the ILD 1450 may be an image-based longitudinal view of the lumen as shown in FIG. 14 or may be a measurement-based longitudinal view similar to the longitudinal view 1210 shown in FIG. 12.

The length measurements along the ILD 1450 may be generated by a user of the system 100 and/or automatically by the processor circuit 510. For example, a user may select various locations along the ILD 1450 and the processor circuit may calculate length measurements corresponding to the selected locations. These various length measurements may also be displayed as metrics 1460 near the ILD 1450. In some embodiments, length measurements may be distinguished from one another by labels, colors, patterns, highlights, or other visual characteristics.

The indicators 1452 and 1456 may be user selected locations along the ILD 1450. In some embodiments, they may be automatically selected. As an example, the indicators 1452 and 1456 may identify the beginning and ending locations of a length measurement. In some embodiments, the indicators 1452 and 1456 correspond to a distal and proximal landing zone for a stent that is being considered by a physician. The iFR estimate value in the physiology data 1490 may be a predicted iFR value with proposed stent positioned within the vessel based on indicators 1452 and 1456. In some embodiments, corresponding indicators may be displayed at corresponding locations along the pathway 1440 of the image 1410.

In some embodiments, one or more bookmarks 1454 may also be included along the ILD 1450. These bookmarks 1454 may correspond to similar bookmarks at corresponding locations along the pathway 1440 of the image 1410.

An indicator 1470 is provided in the screen display 1400, overlaid on the x-ray image 1410. The indicator 1470 identifies for the user that the x-ray image is a zero-contrast image frame.

A graphical user interface includes an extraluminal image, an IVUS image, and a longitudinal view.

The extraluminal image may be an x-ray image. The extraluminal image may be an image obtained with or without contrast introduced to the patient vasculature. In some implementations, the x-ray image may show a view of the same blood vessel shown in the IVUS image and the longitudinal view. The extraluminal image may include a roadmap as well as a plurality of dots. The roadmap may correspond to positions within the image travelled by an IVUS imaging device. The roadmap may be similar to any of the roadmaps previously described herein, including, for example, the roadmap 740 of FIG. 7 and/or the roadmap 840 of FIG. 8. In some implementations, a location along the roadmap may correspond to a location within the longitudinal view. For example, a distal location along the roadmap 1512 may correspond to a distal location of the longitudinal view. A location of the x-ray image and a location of the longitudinal view may correspond to the same position within the body lumen of the patient.

In some implementations, the plurality of dots may correspond to locations at which physiology measurements, such as pressure measurements, were received. As an example, a dot within the extraluminal image may correspond to a single location at which a physiology measurement was acquired. In some embodiments, the locations of the dots within the extraluminal image may align with the roadmap. In other embodiments, the locations of the dots may not align with the roadmap. Some regions of the blood vessel may be imaged by the intravascular imaging device but not measured by the physiology measurement device. In some examples, some regions of the blood vessel may be measured by the physiology measurement device but not imaged by the intravascular imaging device. As an example, along a region, dots corresponding to physiology measurements may be present, however, the roadmap corresponding to the intravascular imaging device may not be present.

In some implementations, the dots of the extraluminal image may alternatively correspond to the locations at which IVUS images were obtained. In such an implementation, a line may correspond to the path of a physiology measurement device during a pullback procedure.

In some implementations, the spacing between the dots may illustrate for a user the speed at which the device, such as a physiology measurement device, traveled through the blood vessel. For example, a spacing between adjacent dots that is larger may correspond to a faster speed. Similarly, a spacing between adjacent dots that is smaller may correspond to a slower speed of the device. In some implementations, a larger spacing may correspond to a slower speed, and the smaller spacing may correspond to a faster speed.

An indicator may identify a location along the pathway corresponding to an IVUS image. Specifically, the indicator may identify the location along the pathway at which the IVUS image was acquired. An additional indicator may identify for a user an iFR value corresponding to the same location as the indicator. In some embodiments, the additional indicator may display any other physiology measurement. Intravascular pressure data indicators may also be positioned within the extraluminal image. The intravascular pressure data indicators may correspond to the pressure measurements obtained along the length of the vessel. The intravascular pressure data indicators may also correspond to either or both of the data 914 and/or 916 of the ILD 910. In some embodiments, the intravascular pressure data indicators may illustrate changes in pressure along the vessel. For example, the presence of a single indicator may correspond to a predetermined change in pressure, such as a 0.01 change in iFR. Indicators may be displayed adjacent to the vessel within the extraluminal image in a line perpendicular to the vessel.

Overlaid over the extraluminal image 1510 may be additional data. Additional data may correspond to physiology measurements acquired within the blood vessel. In some embodiments, the additional data may include an average value, a maximum value, a minimum value, or any other value corresponding to the physiology measurements. In some embodiments, the additional data may also include data corresponding to IVUS measurements. For example, the additional data may correspond to a vessel wall diameter or area, a lumen diameter or area, a plaque burden, or any other value corresponding to an IVUS image obtained at any location within the blood vessel.

The longitudinal view may be an ILD. The ILD may include any features similar to those described with reference to other ILD's of the present application. For example, the ILD may be an image-based ILD or a measurement-based ILD. The ILD may include an indicator. The indicator may identify the location along the ILD at which the IVUS image was acquired. In this way, the indicator of the ILD may correspond to the indicator of the extraluminal image. In some embodiments, as a user moves the indicator within the extraluminal image, the indicator of the ILD may move to a corresponding position and a new IVUS image may be shown. Similarly, if a user moves the indicator of the ILD, the indicator of the extraluminal image may move to a corresponding location and a new IVUS image may be shown.

Overlaid over the ILD may be a line corresponding to raw physiology data acquired by the physiology measurement device and a line corresponding to processed physiology data acquired by the physiology measurement device. Either of the lines may be similar to any of the physiology measurement indicators, lines, or dots described in the present application.

Figure 15:
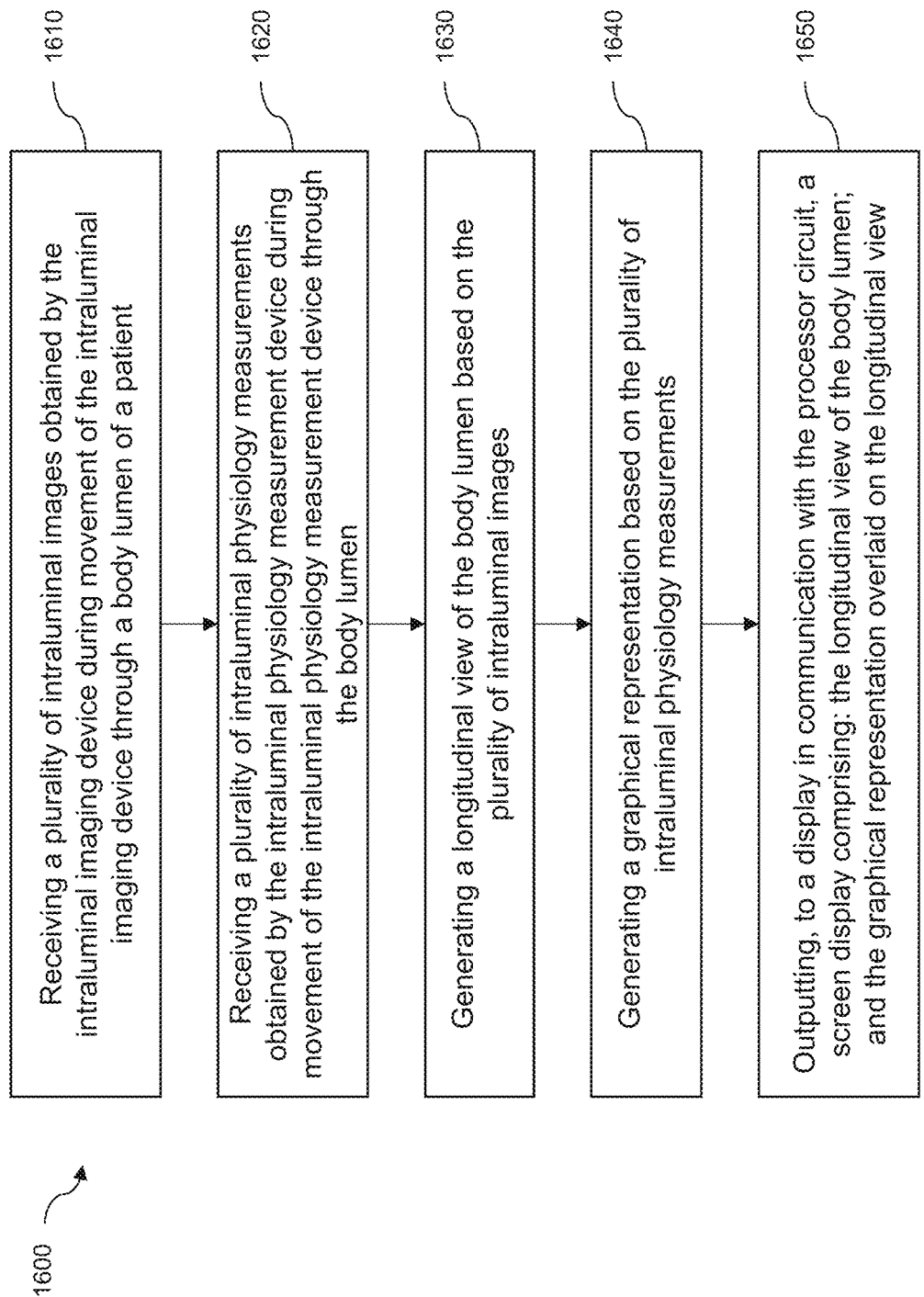
FIG. 15 is a flow diagram of a method of coregistering intraluminal physiology data to a longitudinal image of a body lumen, according to aspects of the present disclosure.

FIG. 15 is a flow diagram of a method 1600 of coregistering intraluminal physiology data to a longitudinal image of a body lumen, according to aspects of the present disclosure. The method 1600 may describe an automatic segmentation of a vessel to detect segments of interest using co-registration of invasive physiology and x-ray images. As illustrated, the method 1600 includes a number of enumerated steps, but embodiments of the method 1600 may include additional steps before, after, or in between the enumerated steps. In some embodiments, one or more of the enumerated steps may be omitted, performed in a different order, or performed concurrently. The steps of the method 1600 can be carried out by any suitable component within the diagnostic system 100 and all steps need not be carried out by the same component. In some embodiments, one or more steps of the method 1600 can be performed by, or at the direction of, a processor circuit of the diagnostic system 100, including, e.g., the processor 560 (FIG. 5) or any other component.

At step 1610, the method 1600 includes receiving a plurality of intraluminal images obtained by the intraluminal imaging device during movement of the intraluminal imaging device through a body lumen of a patient. In some examples, the processor circuit may receive a plurality of IVUS images obtained by the IVUS imaging catheter during movement of the IVUS imaging catheter through a blood vessel of a patient.

At step 1620, the method 1600 includes receiving a plurality of intraluminal physiology measurements obtained by the intraluminal physiology measurement device during movement of the intraluminal physiology measurement device through the body lumen. In some examples, the processor circuit may receive a plurality of intravascular pressure measurements obtained by the pressure-sensing guidewire during movement of the pressure-sensing guidewire through the blood vessel.

At step 1630, the method 1600 includes generating a longitudinal view of the body lumen based on the plurality of intraluminal images. In some examples, the processor circuit may generate a longitudinal view of the blood vessel based on the plurality of IVUS images.

At step 1640, the method 1600 includes generating a graphical representation based on the plurality of intraluminal physiology measurements. In some examples, the processor circuit may generate a graphical representation based on the plurality of intravascular pressure measurements.

At step 1650, the method 1600 includes outputting, to a display in communication with the processor circuit, a screen display comprising: the longitudinal view of the body lumen; and the graphical representation overlaid on the longitudinal view. In some examples, the processor circuit may output, to a display in communication with the processor circuit, a screen display comprising: the longitudinal view of the blood vessel; and the graphical representation overlaid on the longitudinal view.

Persons skilled in the art will recognize that the apparatus, systems, and methods described above can be modified in various ways. Accordingly, persons of ordinary skill in the art will appreciate that the embodiments encompassed by the present disclosure are not limited to the particular exemplary embodiments described above. In that regard, although illustrative embodiments have been shown and described, a wide range of modification, change, and substitution is contemplated in the foregoing disclosure. It is understood that such variations may be made to the foregoing without departing from the scope of the present disclosure. Accordingly, it is appropriate that the appended claims be construed broadly and in a manner consistent with the present disclosure.

What is claimed is:

1. A system comprising:
an intravascular imaging catheter configured for intravascular ultrasound (IVUS) or optical coherence tomography (OCT);
an intravascular pressure-sensing guidewire; and
a processor circuit configured for communication with the intravascular imaging catheter and the intravascular pressure-sensing guidewire, wherein the processor circuit is configured to:
control the intravascular imaging catheter to obtain a plurality of intravascular images during movement of the intravascular imaging catheter through a blood vessel of a patient;
co-register the plurality of intravascular images to first corresponding positions along the blood vessel;
identify, based on co-registering the plurality of intravascular images, a starting position of the movement of the intravascular imaging catheter and a length along the blood vessel traveled by the intravascular imaging catheter during the movement of the intravascular imaging catheter;
control the intravascular pressure-sensing guidewire to obtain a plurality of intravascular pressure measurements during movement of the intravascular pressure-sensing guidewire through the blood vessel;
co-register the plurality of intravascular pressure measurements to second corresponding positions along the blood vessel;
identify, based on co-registering the plurality of intravascular pressure measurements, a starting position of the movement of the intravascular pressure-sensing quidewire and a length along the blood vessel traveled by the intravascular pressure-sensing quidewire during the movement of the intravascular pressure-sensing guidewire;
determine an offset between the starting position of the movement of the intravascular imaging catheter and the starting position of the movement of the intravascular pressure-sensing guidewire;
generate a longitudinal view of the blood vessel based on the plurality of intravascular images such that the longitudinal view comprises a stack of the plurality of intravascular images;
generate a graphical representation based on the plurality of intravascular pressure measurements; and
output, to a display in communication with the processor circuit, a screen display comprising:
the longitudinal view of the blood vessel; and
the graphical representation overlaid on the longitudinal view,
wherein the graphical representation is overlaid on the longitudinal view based on the offset.

2. The system of claim 1,
wherein the graphical representation is overlaid on the longitudinal view such that a location along the graphical representation corresponds to a location along the longitudinal view, and
wherein the location along the graphical representation and the location along the longitudinal view are representative of a same corresponding position along the blood vessel.

3. The system of claim 1,
wherein the graphical representation is overlaid on the longitudinal view based on:
the length along the blood vessel traveled by the intravascular imaging catheter;
and the length along the blood vessel traveled by the intravascular pressure-sensing guidewire.

4. The system of claim 1,
wherein the processor circuit is further configured to:
identify, based on co-registering the plurality of intravascular images, an ending position of the movement of the intravascular imaging catheter; and
identify, based on co-registering the plurality of intravascular pressure measurements, an ending position of the movement of the intravascular pressure-sensing guidewire;
wherein the graphical representation is overlaid on the longitudinal view based on:
the starting position of the movement of the intravascular imaging catheter;
the ending position of the movement of the intravascular imaging catheter;
the starting position of the movement of the intravascular pressure-sensing guidewire; and
the ending position of the movement of the intravascular pressure-sensing guidewire.

5. The system of claim 1, wherein the graphical representation comprises a plot based on the plurality of intravascular pressure measurements.

6. The system of claim 5,
wherein the processor circuit is further configured to calculate a plurality of pressure ratios using the plurality of intravascular pressure measurements, and
wherein the plot based on the plurality of intravascular pressure measurements comprises a plot of the plurality of pressure ratios.

7. The system of claim 1,
wherein the processor circuit is configured to generate a further graphical representation based on the plurality of intravascular pressure measurements,
wherein the screen display comprises the further graphical representation overlaid on the longitudinal view,
wherein the graphical representation comprises a conditioned plot based on the plurality of intravascular pressure measurements, and
wherein the further graphical representation comprises a raw plot based on the plurality of intravascular pressure measurements.

8. The system of claim 1,
wherein the processor circuit is further configured to calculate a plurality of pressure ratios using the plurality of intravascular pressure measurements, and
wherein the graphical representation comprises a plurality of shapes representative of amounts of change between the plurality of pressure ratios.

9. The system of claim 1,
wherein the processor circuit is configured to receive, from a user input device in communication with the processor circuit, a user input selecting a portion of the longitudinal view; and
wherein the screen display further comprises an indicator overlaid on the longitudinal view and identifying the portion of the longitudinal view.

10. The system of claim 1, wherein the screen display further comprises:
an extraluminal image of the blood vessel;
an indicator of the length along the blood vessel traveled by the intravascular imaging catheter overlaid on the extraluminal image; and
an indicator of the length along the blood vessel traveled by the intravascular pressure-sensing guidewire overlaid on the extraluminal image.

11. The system of claim 1, wherein the screen display further comprises:
an extraluminal image of the blood vessel; and
an intravascular image of the plurality of intravascular images.

* * * * *